(12) United States Patent
Yershov et al.

(10) Patent No.: US 11,126,177 B2
(45) Date of Patent: Sep. 21, 2021

(54) SPEED BEHAVIOR PLANNING FOR VEHICLES

(71) Applicant: Motional AD LLC, Boston, MA (US)

(72) Inventors: Dmytro S. Yershov, Cambridge, MA (US); Jeong hwan Jeon, Somerville, MA (US); Tichakorn Wongpiromsarn, Singapore (SG); Eric Wolff, Cambridge, MA (US)

(73) Assignee: Motional AD LLC, Boston, MA (US)

( * ) Notice: Subject to any disclaimer, the term of this patent is extended or adjusted under 35 U.S.C. 154(b) by 293 days.

(21) Appl. No.: 15/879,015

(22) Filed: Jan. 24, 2018

(65) Prior Publication Data

US 2019/0227550 A1   Jul. 25, 2019

(51) Int. Cl.
*G05D 1/00* (2006.01)

(52) U.S. Cl.
CPC ... *G05D 1/0088* (2013.01); *G05D 2201/0212* (2013.01); *G05D 2201/0213* (2013.01)

(58) Field of Classification Search
CPC ......... G05D 1/0088; G05D 2201/0212; G05D 2201/0213
See application file for complete search history.

(56) References Cited

U.S. PATENT DOCUMENTS

| 9,625,261 | B2 | 4/2017 | Polansky et al. | |
| 10,317,899 | B2 | 6/2019 | Liu et al. | |
| 10,514,692 | B2 | 12/2019 | Liu et al. | |
| 10,599,141 | B2 | 3/2020 | Liu et al. | |
| 10,627,810 | B2 | 4/2020 | Liu et al. | |
| 10,740,988 | B2 | 8/2020 | Liu et al. | |
| 2017/0277192 | A1* | 9/2017 | Gupta | B60W 30/20 |
| 2018/0356830 | A1* | 12/2018 | Haghighat | B60W 10/04 |
| 2018/0364702 | A1 | 12/2018 | Liu et al. | |
| 2019/0121362 | A1* | 4/2019 | Russell | B60W 30/16 |

FOREIGN PATENT DOCUMENTS

CN   105652300   6/2016

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.
Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

* cited by examiner

*Primary Examiner* — Michael D Lang
(74) *Attorney, Agent, or Firm* — Fish & Richardson P.C.

(57) ABSTRACT

Among other things, a system provides speed behavior planning for vehicles with autonomous driving capabilities.

18 Claims, 13 Drawing Sheets

SPEED BEHAVIOR PLANNING FOR VEHICLES

BACKGROUND

This description relates to speed behavior planning for vehicles.

SUMMARY

In general, in one aspect, a method comprises receiving current information about a speed behavior factor for a vehicle being driven, deriving a candidate speed behavior for the vehicle based on the speed behavior factor, and deriving a definitive speed behavior based on the candidate speed behavior.

In some implementations of the method, receiving current information about a speed behavior factor may comprise receiving signals from one or more sensors. Receiving current information about a speed behavior factor may comprise receiving information from a data source, remotely or locally or both. The speed behavior factor may comprise one or more of the following: a legal specification, a moving object, an event, a mechanical limitation of the vehicle, a condition of a vehicle component, a weather condition, a user preference, an occlusion, or a road feature. In some implementations of the method, a candidate speed behavior may comprise a speed limit.

In some implementations of the method, deriving a candidate speed behavior or deriving a definitive speed behavior may be applied along a trajectory. Deriving a candidate speed behavior or deriving a definitive speed behavior may be performed in a spatial domain or a time domain or both.

In some implementations of the method, deriving a candidate speed behavior may comprise concatenating speed limits along a trajectory. Deriving a candidate speed behavior may comprise identifying minima of aggregation of one or more given speed limits. Deriving a candidate speed behavior may comprise using a function to describe a speed behavior between a speed behavior factor and the vehicle. Deriving a candidate speed behavior may comprise using a function to smooth one or more speed discontinuities. In some implementations of the method, the function may relate a speed to a distance or to a time or to both. The function may comprise a linear function or a nonlinear function or both.

In some implementations of the method, smoothing one or more discontinuities may include smoothing step-down discontinuities. Smoothing one or more discontinuities may comprises smoothing step-up discontinuities. Smoothing one or more discontinuities may comprise ignoring smoothing step-up discontinuities.

In some implementations of the method, deriving a candidate speed behavior or deriving a definitive speed behavior may comprise using a queueing process to hold and arrange one or more candidate speed behaviors in a queue. The queue may be ordered based on speed values of the one or more speed behaviors. The queue may be time dependent or space dependent or both.

In some implementations of the method, deriving a definitive speed behavior may comprise using an optimization algorithm to find the speed behavior. Deriving a definitive speed behavior may comprise optimizing smoothness of acceleration. Deriving a definitive speed behavior may comprise optimizing smoothness of jerk. Deriving a definitive speed behavior may comprise treating the speed behavior as a hard constraint in an optimization algorithm. Deriving a definitive speed behavior may comprise treating the speed behavior as a soft constraint in an optimization algorithm. Deriving a definitive speed behavior may comprise treating the speed behavior as a partially soft constraint and a partially hard constraint in an optimization algorithm. Deriving a definitive speed behavior may comprise considering past driven speed behaviors. Deriving a definitive speed behavior may comprise considering past definitive speed behaviors. Deriving a definitive speed behavior may comprise considering a current speed of the vehicle. Deriving a definitive speed behavior may comprise maximizing a driving distance. Deriving a definitive speed behavior may comprise minimizing a driving time. Deriving a definitive speed behavior may comprise optimizing a longitudinal speed behavior. Deriving a definitive speed behavior may comprise optimizing a lateral speed behavior. Deriving a definitive speed behavior may comprise optimizing a longitudinal speed behavior and a lateral speed behavior together in an optimization process.

Implementations of the method may include communicating with one or more remote computing devices. The communication may comprise communicating with one or more mobile devices. The communication may comprise communicating with one or more user interface devices. The communication may comprise communicating with one or more teleoperation servers. The communication may comprise communicating with one or more fleet management servers.

Implementations of the method may include causing a vehicle to self-drive based on the definitive speed behavior.

Implementations of the method may include iterating the activities at a temporal frequency at least once per second. Implementations of the method may include iterating the activities at a spatial frequency at least once per 1 m. Implementations of the method may include iterating the activities at or before a bifurcation point in given trajectories. Implementations of the method may include iterating the activities at or before a merging point in given trajectories. Implementations of the method may include iterating the activities at or before a crossing point in given trajectories.

Implementations of the method may include visualizing the definitive speed behavior.

In general, in one aspect, a vehicle includes (a) driving components including an acceleration component, a steering component, and a deceleration component; (b) autonomous driving capabilities to issue signals to the driving components to drive the vehicle in an at least partial autonomous driving mode; (c) a planning component to receive current information about a speed behavior factor, derive a candidate speed behavior for the vehicle based on the speed behavior factor, and derive a definitive speed behavior based on the candidate speed behavior; and (d) a command component to cause the driving components to self-drive the vehicle based on the definitive speed behavior.

In some implementations of the vehicle, receiving current information about a speed behavior factor may comprise receiving signals from one or more sensors. Receiving current information about a speed behavior factor may comprises receiving information from a data source, remotely or locally or both. The speed behavior factor may comprise one or more of the following: a legal specification, a moving object, an event, a mechanical limitation of the vehicle, a condition of a vehicle component, a weather condition, a user preference, an occlusion, or a road feature.

In some implementations of the vehicle, a candidate speed behavior may comprise a speed limit. Deriving a candidate speed behavior or deriving a definitive speed behavior may be applied along a trajectory. Deriving a candidate speed behavior or deriving a definitive speed behavior may be performed in a spatial domain or a time domain or both. Deriving a candidate speed behavior may comprise concatenating speed limits along a trajectory. Deriving a candidate speed behavior may comprise identifying minima of aggregation of one or more given speed limits. Deriving a candidate speed behavior may comprise using a function to describe a speed behavior between a speed behavior factor and the vehicle. Deriving a candidate speed behavior may comprise using a function to smooth one or more speed discontinuities. The function may relate a speed to a distance or to a time or to both. The function may comprise a linear function or a nonlinear function or both.

In some implementations of the vehicle, smoothing one or more discontinuities may comprise smoothing step-down discontinuities. Smoothing one or more discontinuities may comprise smoothing step-up discontinuities. Smoothing one or more discontinuities may comprise ignoring smoothing step-up discontinuities.

In some implementations of the vehicle, deriving a candidate speed behavior or deriving a definitive speed behavior may comprise using a queueing process to hold and arrange one or more candidate speed behaviors in a queue. The queue may be ordered based on speed values of the one or more speed behaviors. The queue may be time dependent or space dependent or both.

In some implementations of the vehicle, deriving a definitive speed behavior may comprise using an optimization algorithm to find the speed behavior. Deriving a definitive speed behavior may comprise optimizing smoothness of acceleration. Deriving a definitive speed behavior may comprise optimizing smoothness of jerk. Deriving a definitive speed behavior may comprise treating the speed behavior as a hard constraint in an optimization algorithm. Deriving a definitive speed behavior may comprise treating the speed behavior as a soft constraint in an optimization algorithm. Deriving a definitive speed behavior may comprise treating the speed behavior as a partially soft constraint and a partially hard constraint in an optimization algorithm. Deriving a definitive speed behavior comprises considering past driven speed behaviors. Deriving a definitive speed behavior may comprise considering past definitive speed behaviors. Deriving a definitive speed behavior may comprise considering a current speed of the vehicle. Deriving a definitive speed behavior may comprise maximizing a driving distance. Deriving a definitive speed behavior may comprise minimizing a driving time. Deriving a definitive speed behavior may comprise optimizing a longitudinal speed behavior. Deriving a definitive speed behavior may comprise optimizing a lateral speed behavior. Deriving a definitive speed behavior may comprise optimizing a longitudinal speed behavior and a lateral speed behavior together in an optimization process.

Implementations of the vehicle may include a communication component communicating with one or more remote computing devices. The communication component may communicate with one or more mobile devices. The communication component may communicate with one or more user interface devices. The communication component may communicate with one or more teleoperation servers. The communication component may communicate with one or more fleet management servers.

In some implementations of the vehicle, the planning component may iterate the processing activities at a temporal frequency at least once per second. The planning component may iterate the processing activities at a spatial frequency at least once per 1 m. The planning component may iterate the processing activities at or before a bifurcation point in given trajectories. The planning component may iterate the processing activities at or before a merging point in given trajectories. The planning component may iterate the processing activities at or before a crossing point in given trajectories.

Implementations of the vehicle may include a display visualizing the definitive speed behavior.

In general, in one aspect, an apparatus may include a storage for instructions and a processor to operate in accordance with the instructions to (1) receive current information about a speed behavior factor for a vehicle being driven, (2) derive a candidate speed behavior for the vehicle based on the speed behavior factor, and (3) derive a definitive speed behavior based on the candidate speed behavior.

In some implementations of the apparatus, receiving current information about a speed behavior factor may comprise receiving signals from one or more sensors. Receiving current information about a speed behavior factor may comprise receiving information from a data source, remotely or locally or both. The speed behavior factor may comprise one or more of the following: a legal specification, a moving object, an event, a mechanical limitation of the vehicle, a condition of a vehicle component, a weather condition, a user preference, an occlusion, or a road feature. A candidate speed behavior may comprise a speed limit.

In some implementations of the apparatus, deriving a candidate speed behavior or deriving a definitive speed behavior may be applied along a trajectory. Deriving a candidate speed behavior or deriving a definitive speed behavior may be performed in a spatial domain or a time domain or both. Deriving a candidate speed behavior may comprise concatenating speed limits along a trajectory. Deriving a candidate speed behavior may comprise identifying minima of aggregation of one or more given speed limits. Deriving a candidate speed behavior may comprise using a function to describe a speed behavior between a speed behavior factor and the vehicle. Deriving a candidate speed behavior may comprise using a function to smooth one or more speed discontinuities. The function may relate a speed to a distance or to a time or to both. The function may comprise a linear function or a nonlinear function or both.

In some implementations of the apparatus, smoothing one or more discontinuities may comprise smoothing step-down discontinuities. Smoothing one or more discontinuities may comprise smoothing step-up discontinuities. Smoothing one or more discontinuities may comprise ignoring smoothing step-up discontinuities.

In some implementations of the apparatus, deriving a candidate speed behavior or deriving a definitive speed behavior may comprise using a queueing process to hold and arrange one or more candidate speed behaviors in a queue. The queue may be ordered based on speed values of the one or more speed behaviors. The queue may be time dependent or space dependent or both. Deriving a definitive speed behavior may comprise using an optimization algorithm to find the speed behavior. Deriving a definitive speed behavior may comprise optimizing smoothness of acceleration. Deriving a definitive speed behavior may comprise optimizing smoothness of jerk. Deriving a definitive speed behavior may comprise treating the speed behavior as a hard constraint in an optimization algorithm. Deriving a definitive speed behavior may comprise treating the speed behavior as a soft constraint in an optimization algorithm. Deriving a definitive speed behavior may comprise treating the speed behavior as a partially soft constraint and a partially hard constraint in an optimization algorithm. Deriving a definitive speed behavior may comprise considering past driven speed behaviors. Deriving a definitive speed behavior may comprise considering past definitive speed behaviors. Deriving a definitive speed behavior may comprise considering a current speed of the vehicle. Deriving a definitive speed behavior may comprise maximizing a driving distance. Deriving a definitive speed behavior may comprise minimizing a driving time. Deriving a definitive speed behavior may comprise optimizing a longitudinal speed behavior. Deriving a definitive speed behavior may comprise optimizing a lateral speed behavior. Deriving a definitive speed behavior may comprise optimizing a longitudinal speed behavior and a lateral speed behavior together in an optimization process.

Implementations of the apparatus may include a communication component communicating with one or more remote computing devices. The communication component may communicate with one or more mobile devices. The communication component may communicate with one or more user interface devices. The communication component may communicate with one or more teleoperation servers. The communication component may communicate with one or more fleet management servers. The communication component may transmit commands to cause a vehicle to self-drive based on the definitive speed behavior.

In some implementations of the apparatus, the processor may iterate the processing activities at a temporal frequency at least once per second. The processor may iterate the processing activities at a spatial frequency at least once per 1 m. The processor may iterate the processing activities at or before a bifurcation point in given trajectories. The processor may iterate the processing activities at or before a merging point in given trajectories. The processor may iterate the processing activities at or before a crossing point in given trajectories.

Implementations of the apparatus may include a display, or communicating with a display, to visualize the definitive speed behavior.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DESCRIPTION

Figure 1:
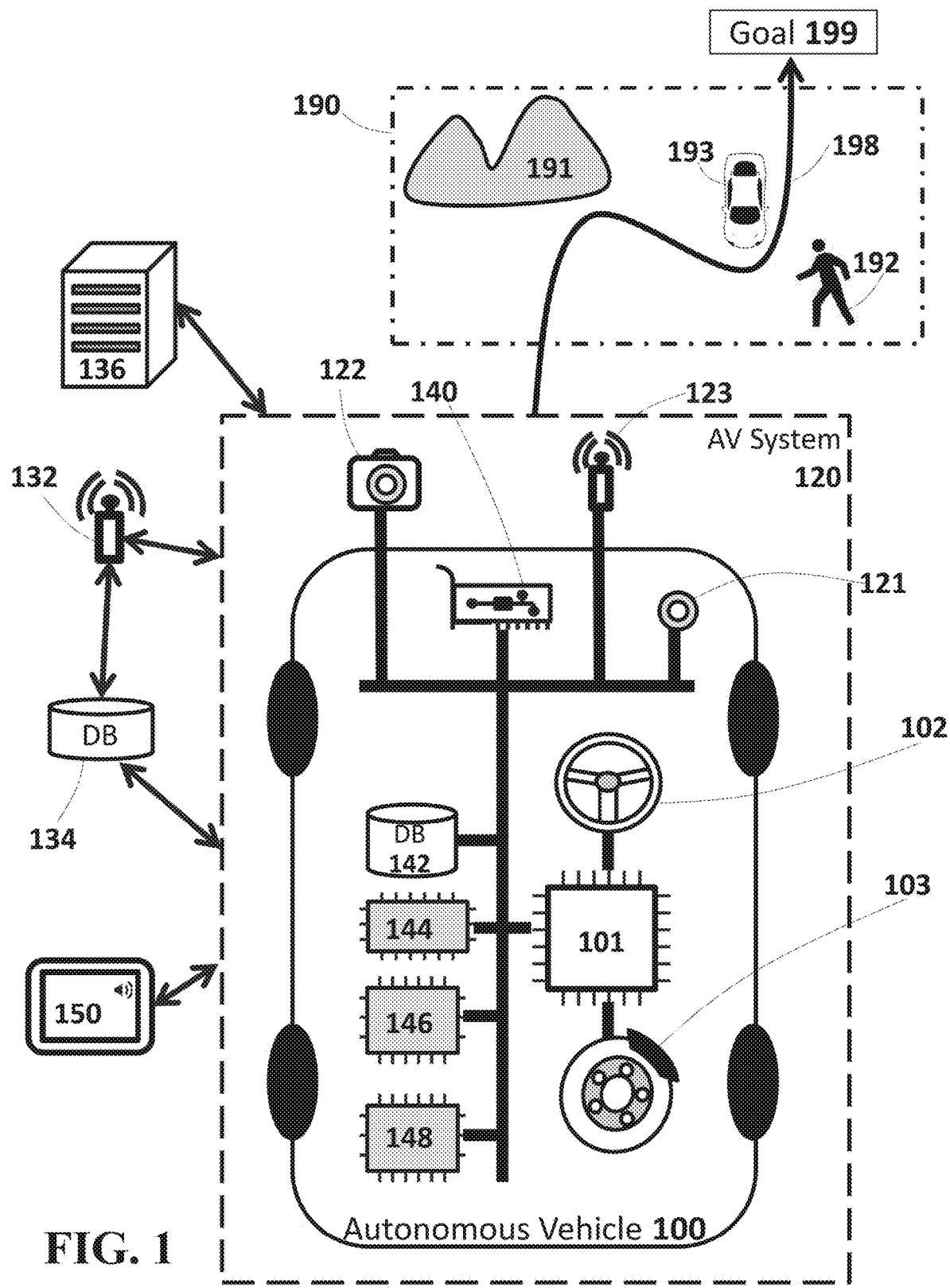
FIG. 1 is a block diagram of an AV system.

The term "autonomous vehicle" or "AV" is used broadly to include, for example, a vehicle having one or more autonomous driving capabilities.

The term "autonomous driving capability" is used broadly to include, for example, any function, feature, or facility that can participate in the driving of an AV other than by a person manipulating a steering wheel, accelerator, brake, or other physical controller of the AV.

The term "trajectory" is used broadly to include, for example, any path or route from one place to another; for instance, a path from a pickup location to a drop off location or a path toward a goal position. In some implementations, a trajectory may be coupled with speed behavior information.

The term "goal" or "goal position" is used broadly to include, for example, any place to be reached by an AV, including, for example, an interim drop-off location, a final drop-off location, or a destination, among others.

The term "driving environment" is used broadly to include, for example, any characteristic, property, condition, or parameter of the physical world in which a vehicle is driving, including the road network and static and moving physical objects such as buildings, other vehicles, or pedestrians, to name a few. The driving environment can be associated with an immediate or nearby vicinity or neighborhood or with more distant locales such as places that are along the planned trajectory of the vehicle.

The term "events" is used broadly to include, for example, any occurrence that may interfere with travel along a road network, such as sports, games, marathons, protests, parades, concerts, political campaigns, fires, floods, collisions, traffic light failures, inclement weather, and police actions.

The term "speed behavior factor" is used broadly to include, for example, any characteristic, property, parameter, circumstance, influence, value, object, context, specification, condition, law, or constraint that is useful in deriving or otherwise relevant to or one or more speed behaviors, or that applies to or may apply to computing, proposing, controlling, suggesting, or instructing one or more speed behaviors.

The term "speed behavior" is used broadly to include, for example, any conduct or operation of a vehicle that encompasses, defines, implies, is the basis of, or otherwise relates to a speed of the vehicle, such as a constant speed, a maximum speed, a minimum speed, a changing speed, zero speed, derivatives of speed, mathematical functions of speed, a drivable speed pattern, or any other profile of speed. In some cases, a speed behavior may be computationally or in some other way derived, proposed, controlled, suggested, or instructed from one or more speed behavior factors, or information about a driving environment or a vehicle system condition, or of the combination of them. A speed behavior may be exhibited as a function in a temporal domain or a spatial domain, or both domains. A speed behavior may be exhibited at a given time or times or during a period or periods of time, including any fixed speeds, varying speeds, minimum speeds, maximum speeds, profiles of varying speeds, conditional speeds or speed profiles, candidate speeds or speed profiles, and definitive speeds or speed profiles or combinations of them. A speed behavior may entail a speed limit, such as a maximum speed or a minimum speed suggested or required by the speed behavior.

The term "speed limit" is used broadly to include, for example, a speed behavior comprising a restriction on the speed of a vehicle such as a maximum speed limit or a minimum speed limit.

The term "candidate speed behavior" is used broadly to include, for example, any putative, possible, potential, or hypothetical speed behavior of a vehicle that is under consideration to be used as part of or all of a definitive speed behavior for the vehicle.

The term "definitive speed behavior" is used broadly to include, for example, any actual, decided, selected, or applied speed behavior that is intended for or is actually used by a vehicle in its driving. A definitive speed behavior may be the same as, derived from, or a modified version of a candidate speed behavior.

AV System

This document describes technologies applicable to, for example, any vehicle that has one or more autonomous driving capabilities including a fully autonomous vehicle, a highly autonomous vehicle, and a conditionally autonomous vehicle, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). Autonomous driving capabilities may include controlling the steering or speed of a vehicle. The technologies described in this document also can be applied to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). One or more of the Level 1, 2, 3, 4 and 5 vehicles may automate certain vehicle operations (e.g., steering, braking, and using maps) under certain driving conditions based on processing of sensor inputs. The technologies described in this document can benefit a vehicle having any level of autonomy, ranging from fully autonomous vehicles to human-operated vehicles.

As shown in FIG. 1, a typical activity of an AV 100 is to safely and reliably drive autonomously or partially manually or both along a trajectory 198 through an environment 190 toward a goal location 199 while avoiding objects (e.g., mountains 191, vehicles 193, pedestrians 192, cyclists, and other obstacles) and obeying rules of the road (e.g., rules of operation or driving preferences).

The driving of an AV 100 typically is supported by an array of technologies (e.g., hardware, software, and stored and real-time data) that this document together (and with the AV 100) sometimes refers to as an AV system 120. In some implementations, one or some or all of the technologies are onboard the AV 100. In some cases, one or some or all of the technologies of the AV system may be at another location such as at a server (e.g., in a cloud computing infrastructure). Components of an AV system 120 can include one or more or all of the following (among others).

1. Functional devices 101 of the AV 100 that are instrumented to receive and act on commands for driving (e.g., steering 102, acceleration, deceleration, gear selection, and braking 103) and for auxiliary functions (e.g., turning signal activation) from one or more computing processors 146 and 148.
2. One or more data storage units 142 or memory 144 or both for storing machine instructions or various types of data or both.
3. One or more sensors 121 for measuring or inferring, or both, properties of the AV's state or condition, such as the AV's position, linear and angular velocity and acceleration, and heading (e.g., an orientation of the leading end of the AV). For example, such sensors can include, but are not limited to: GPS; inertial measurement units that measure both vehicle linear accelerations and angular rates; individual wheel speed sensors for measuring or estimating individual wheel slip ratios; individual wheel brake pressure or braking torque sensors; engine torque or individual wheel torque sensors; and steering wheel angle and angular rate sensors.
4. One or more sensors for sensing or measuring properties of the AV's environment. For example, such sensors can include, but are not limited to: monocular or stereo video cameras 122 operating in the visible light, infrared, or thermal (or both) spectra; lidar 123; radar; ultrasonic sensors; time-of-flight (TOF) depth sensors; speed sensors; and temperature and rain sensors.
5. One or more communications devices 140 for communicating measured or inferred or both properties of the AV or of other vehicles' states and conditions, such as positions, linear and angular velocities, linear and angular accelerations, and linear and angular headings. These devices include Vehicle-to-Vehicle (V2V) and Vehicle-to-Infrastructure (V2I) communication devices and devices for wireless communications over point-to-point or ad hoc networks or both. The communications devices 140 can communicate across the electromagnetic spectrum (including radio and optical communications) or other media (e.g., air and acoustic media).
6. One or more communication interfaces 140 (e.g., wired, wireless, WiMAX, Wi-Fi, Bluetooth, satellite, cellular, optical, near field, or radio, or combinations of them) for transmitting data to and from a remotely located database 134 to the AV system 120, transmitting sensor data or data related to driving performance to or from a remotely located database 134, or transmitting information that relates to operations of the AV system or to teleoperations, or a combination of them.
7. One or more data sources 142 for providing historical, or real-time, or predictive information, or a combination of any two or more of them about the AV's environment 190, including, for example, maps, driving performance, traffic congestion updates or weather conditions. Such data may be stored on a data storage unit 142 or memory 144 on the AV 100, or may be transmitted to the AV 100 via a communications channel from a remote database 134 or a combination of them.
8. One or more data sources 136 for providing digital road map data from GIS databases, potentially including one or more of the following: high-precision maps of the roadway geometric properties; maps describing road network connectivity properties; maps describing roadway physical properties (such as traffic speed, traffic volume, the number of vehicular and cyclist traffic lanes, lane width, lane traffic directions, or lane marker types and locations, or combinations of them); and maps describing the spatial locations of road features such as crosswalks, traffic signs or other travel signals of various. Such data may be stored on a memory 144 on the AV 100, or transmitted to the AV 100 via a communications channel from a remotely located database server 134, or a combination of the two.
9. One or more data sources 134 or sensors 132 for providing historical information about driving properties (e.g., speed and acceleration behaviors) of vehicles that have previously traveled along local road sections, for example, at similar times of day. Such data may be stored on a memory 144 on the AV 100, or transmitted to the AV 100 via a communications channel from a remotely located database 134, or a combination of the two.
10. One or more computing devices 146 and 148 located on the AV 100 (or remotely or both) for executing algorithms for (e.g., on-line) generation of control actions based on both real-time sensor data and prior information, allowing the AV system 120 to execute its autonomous driving capabilities.
11. One or more processes of processing sensor data, perceiving the environment, understanding conditions that are currently presented by and may at future times be presented by the perceived environment, performing trajectory planning, performing motion control, and making decisions based on those perceptions and understandings. A process may be implemented by integrated circuits, field-programmable gate arrays, hardware, software, or firmware, or a combination of two or more of them.
12. One or more interface devices 150 (e.g., displays, mice, track balls, keyboards, touchscreens, biometric readers, augmented reality glasses, gesture readers, speakers, microphones, and sound recorders) coupled to the computing devices 146 and 148 for providing information and alerts to, and receiving input from, a user (e.g., an occupant or a remote user) of the AV 100. The coupling may be wireless or wired. Any two or more of the interface devices may be integrated into a single device.
13. One or more applications running on computing devices (e.g., mobile devices, laptops, tablets, or smartphones) of users of the AV system for providing interactive user interfaces on the computing devices, communicating with the AV system including with the AV, executing processes related to participation of the user in a system that hosts AVs, to hailing of AVs, to use of AVs, to providing information to the user about AVs, and a wide variety of other functions.

Speed Behavior Factors

When an AV is driven on a road by an AV system, its speed behavior may be constrained, controlled, regulated, impacted, or influenced by one or a combination of two or more speed behavior factors. Examples of speed behavior factors include the following.
1. Legal specifications. A speed behavior such as a speed limit (either a maximum limit or a minimum limit) may be specified by law serving as a speed behavior factor. For example, a maximum speed limit on a highway segment may be 65 miles per hour (mph); speed limits on different highway segments may vary. A maximum speed limit on a downtown road may be 15 mph. In some instances, laws may require vehicles to stop at a stop sign or a stop signal (e.g., a red light, a road mark, a stop line, or a gesture by a traffic director), so the speed must be 0 mph in front of the stop sign or the stop signal. In some cases, minimum speed limits may be set, for example, a minimum speed of 45 mph on a limited access highway. In some cases, the law may impose other kinds of speed behaviors such as "maintain speed through the tunnel"; or "reduce speed in work zone." Some legal specifications can be considered "hard speed behavior factors" in that they comprise static, specific statements of required speed behaviors. Some legal specifications can be considered "conditional speed behavior factors" in that they state speed behaviors in terms of conditions that trigger them, for example, "If the vehicle is driving on an interstate highway outside an urban area, the maximum speed is 65 mph. If the vehicle is driving on an interstate highway in an urban area, the maximum speed is 55 mph." Some legal specifications are examples of "unconditional speed behavior factors" such as "The speed of a vehicle at stop sign must be 0 mph."
2. Objects in driving environments. When an object is detected in the driving environment, the presence of the object may require a safeguarding or otherwise appropriate speed behavior by the AV system. For example, when approaching a pedestrian crossing, the AV system may reduce its speed or make a full stop to yield to any pedestrian. In some implementations, a pedestrian or an animal may jaywalk on the road, and the AV system may reduce its speed or make a full stop to avoid hitting the pedestrian or the animal. In some instances, when driving on the road, the speed behavior of the AV system may require observing a speed limit according to the speed of a leading vehicle. In some implementations, the AV system may reduce its speed to avoid scaring or causing stress to a nearby object (e.g., another vehicle, a bicyclist, or a walking pedestrian). In some cases, the AV system may determine and then avoid a buffer zone in the vicinity of another object (e.g., a parked car, a vehicle in an adjacent lane, or a nearby person). A buffer zone provides room for unexpected motion of the other object, for example. In general, when the speed of an AV system is relatively higher, a larger buffer zone may be preferred. When the speed is relatively lower, a smaller buffer zone may be adequate. In some cases, the available space in the vicinity of the other object may limit the possible size of the buffer zone and may constrain the AV system to reduce its speed below a corresponding upper speed limit. For example, if the passable portion of a street is narrowed due to snow banks, the AV system may slow down when passing along the narrowed passable portion.
3. Events. An event may take place in the neighborhood of the AV system or may be held on the roads that are part of the AV system's planned trajectory. Thus, a maximum speed limit on the AV system may be imposed by, for example, crowds or traffic or both associated with an event.
4. Mechanical limitations. In general, maneuvering the AV system may exert a lateral force on the AV when the AV makes, for example, a lane change, a right turn, a left turn, a swerve, or a U-turn. On those occasions, the speed of the AV will have both a longitudinal component along the direction of travel and a lateral component normal to the direction of travel. To avoid rollovers or skidding, maneuvers that cause lateral forces (and corresponding lateral components of speed) must be coordinated with the longitudinal component of speed, for example by imposing a maximum speed limit for the longitudinal component. In some examples, a sudden change (e.g., dropping from 55 mph to 0 mph) in speed is not feasible or appropriate for the mechanical systems of the AV, which therefore may impose a speed behavior to cause the AV system to smoothly reduce its speed.
5. AV component failures. If a component of the AV system fails while in operation, the AV system may self-impose a maximum speed limit to reduce risks associated with the component failure. For example, if the pressure in a tire falls below a safe level, the AV may self-impose a maximum speed limit of 45 mph.

6. Weather conditions. The speed of an AV may be limited by weather conditions. For example, wet or icy road surfaces due to flood, rain, or snow may cause the AV system to reduce its speed to no more than a maximum speed limit to avoid risks. For instance, during driving the AV system may happen to orient vision sensors directly towards a strong light source (e.g., the sun), so the vision sensing may degrade due to the extreme brightness; the sensing degradation may cause the AV system to reduce its speed so that the AV system can safely react to unexpected driving scenarios.

7. User preferences. The AV system may be subject to a speed limit imposed by preferences of a user. For example, a rider of the AV system may prefer its speed not exceed a threshold, say 40 mph. For instance, a sender employing an AV system to ship a delicate piece of china may want to limit the speed of the AV system to avoid harsh motion that might break the china. In some cases, the AV system may be used to carry a patient or an injured person, and the maximum speed limit may be set to accommodate the comfort of the patient.

8. Road features. The road features may induce speed limits as well. For example, when the curvature of a road is high, the maximum speed limit of the AV system may be low to avoid rollovers or skids. When the road surface is bumpy or not paved, the AV system may have a lower maximum speed limit. When the AV system drives on a mountain road, the speed may be limited to prevent driving over the cliff.

Speed Behavior Planner

Figure 2:
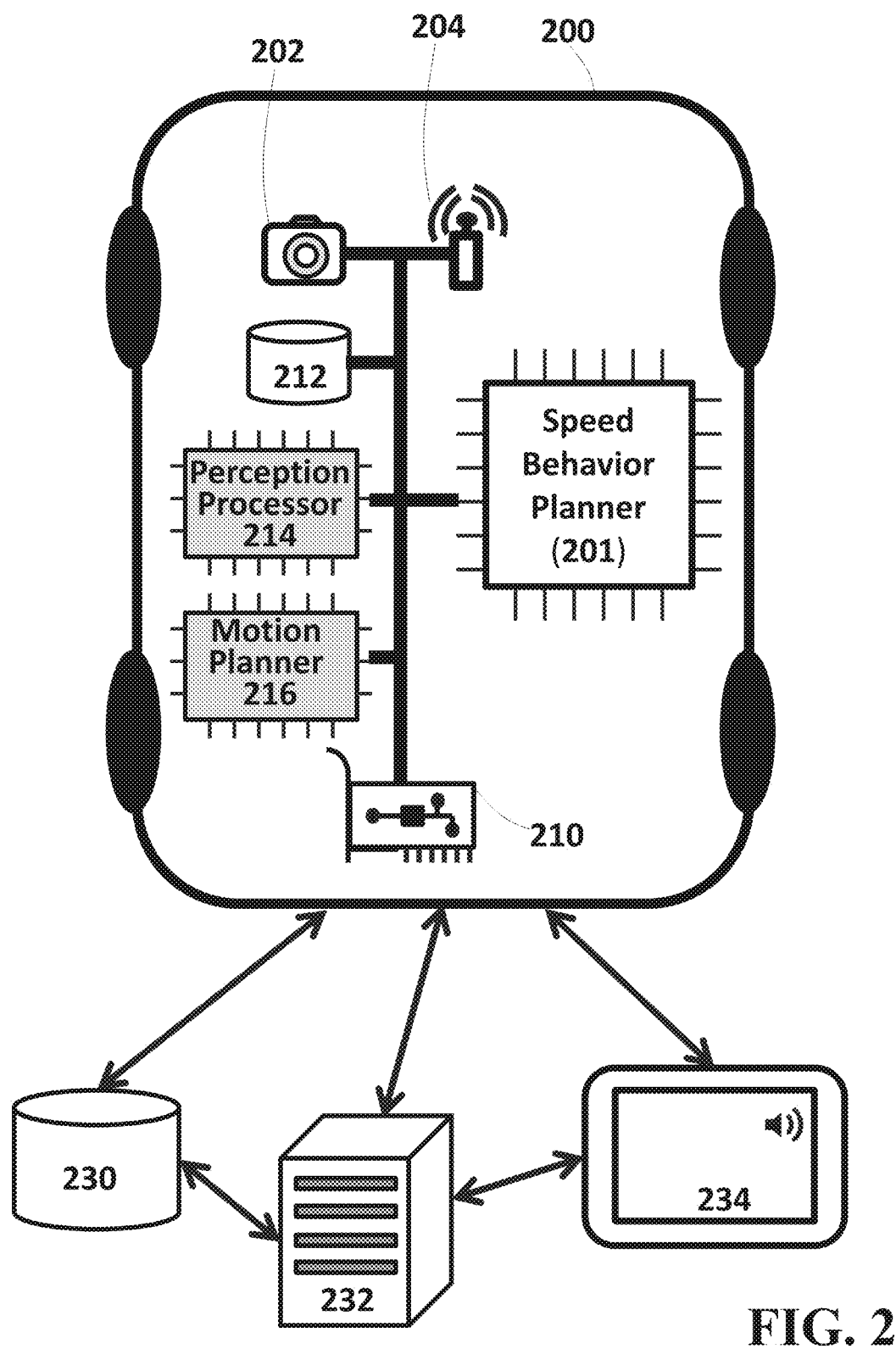
FIG. 2 shows an example of a speed behavior planner communicating with other devices.

As shown in FIG. 2, implementations of the AV system may include a speed behavior planner 201. An important activity of the speed behavior planner is to determine a speed behavior for the AV based on a wide variety of relevant information and generally to impose the speed behavior on the driving of the AV. The speed behavior planner may be realized by one or more of software, firmware, or hardware (e.g., computing devices, electronic circuits, field programmable gate arrays, or application specific integrated circuits, or combinations of them) or combinations of them, or in other ways.

The speed behavior planner 201 may communicate with (e.g., receive or send information or instructions from or to) other components of the AV system 200. In some cases, one or more of such components may be included as part of the speed behavior planner 201.

The speed behavior planner 201 may communicate with (e.g., receive or send information or instructions from or to) one or more sensors 202 and 204. Examples of sensors include: monocular cameras, stereo cameras, video cameras, lidars, radars, infrared sensors, ultraviolet sensors, thermometers, pressure sensors, odometers, velocity sensors, and chemical sensors. One or more sensors may provide signals that indicate the motion status of the AV system (e.g., longitudinal speed, lateral speed, acceleration, or torque, or combinations of them). In some cases, one or more sensors may provide signals about the driving environment (e.g., another moving object on the road, traffic light signals, drivable areas, non-drivable areas, lanes, traffic volume, traffic speed, pavement markings, or traffic signs, or combination of them).

Implementations of the speed behavior planner 201 may include communication with (e.g., receive or send information or instructions from or to) a motion planner 216. The received information could include one or more trajectories towards the goal position. In some examples, the speed behavior planner 201 may communicate with a perception processor 214 to receive information about the perceived driving environment (e.g., traffic light signals, traffic volumes, traffic speeds, other vehicles, pedestrians, animals, events, and hidden objects) of the AV system 200. In some cases, the perception processor 214 may receive signals from sensors, process the signals, and send processed results to the speed behavior planner 201 for planning the speed behavior.

In some implementations, the speed behavior planner 201 may communicate with (e.g., receive or send information or instructions from or to) a local database 212 via a network interface or a data bus, or with a remote database 230 via wireless communication interface 210, or both. A database (212, or 230, or both) may store and provide various types of information. Examples of the information include: event schedules, static information (e.g., maps, road configuration, road complexity, buildings, traffic signs, traffic light locations, lanes, curbsides, crosswalks, and sidewalks), dynamic information (e.g., traffic light signals, traffic volumes, traffic speeds, other vehicles, pedestrians, animals, and events) which may be perceived by the perception processor 214, and routing information (e.g., a trajectory towards the goal position) which may be created by the motion planner 216.

In some implementations, the speed behavior planner 201 may communicate with (e.g., receive or send information or instructions from or to) a user interface 234, which may be on a computing device (e.g., smartphone, mobile device, portable device, or desktop). A user interface 234 may be presented locally in the AV, or outside the AV, or in a remote location, or a combination of those. There may be two or more user interfaces simultaneously communicating with the speed behavior planner 201. A user interface 234 may display speed information (e.g., speed of the AV system, speed of another vehicle, speed limits, speed behavior factors, or perceived objects, or combinations of them). In some cases, the communication with a user interface 234 may be made via a local network on the AV system 200. In some implementations, the communication with a user interface 234 may occur via a server 232. In addition to presenting information to the user, the user interface may receive preferences, instructions, or other information from the user, for example, information about a preferred or intended speed limit or other speed behavior. On a mobile phone or other mobile device, the user interface can be presented by a native app installed on and running on the mobile device. The native app may be considered part of the AV system.

In some implementations, the speed behavior planner 201 may communicate with (e.g., receive or send information or instructions from or to) a server 232, which may be located on the AV 200, or in a remote location, or both. There may be two or more servers simultaneously communicating with the speed behavior planner 201. A server 232 may provide various types of services. For example, a server 232 may provide data services, by transmitting various types of the previously mentioned information and data to the speed behavior planner 201. For example, a server 232 may transmit speed limits, speed behavior factors, speed behaviors, or other speed behavior, or combinations of them to the speed behavior planner 201.

In some examples, a server 232 may provide teleoperation services, where a remote operator (e.g., a human or a computer program or both) may transmit commands for speed behavior planning to the speed behavior planner 201. (Additional information about teleoperation services is contained in U.S. patent application Ser. Nos. 15/624,780, 15/624,802, 15/624,819, 15/624,838, 15/624,839, and 15/624,857, all of which are incorporated here by reference.)

In some instances, a server 232 may provide fleet management services, where a fleet manager (e.g., a human or a computer program or both) may transmit fleet information to the AV system 200 to enable the speed behavior planner 201 to make suitable adjustments to speed behavior planning. For example, a fleet manager may designate a new goal position to the AV system, so the AV system may change its trajectory and adjust its speed behavior. In some implementations, a fleet manager may receive or predict new driving information due to occurrence of an event, and the fleet manager may request the AV system to set a new speed limit in its speed behavior.

Speed Behavior Planning

Figure 3:
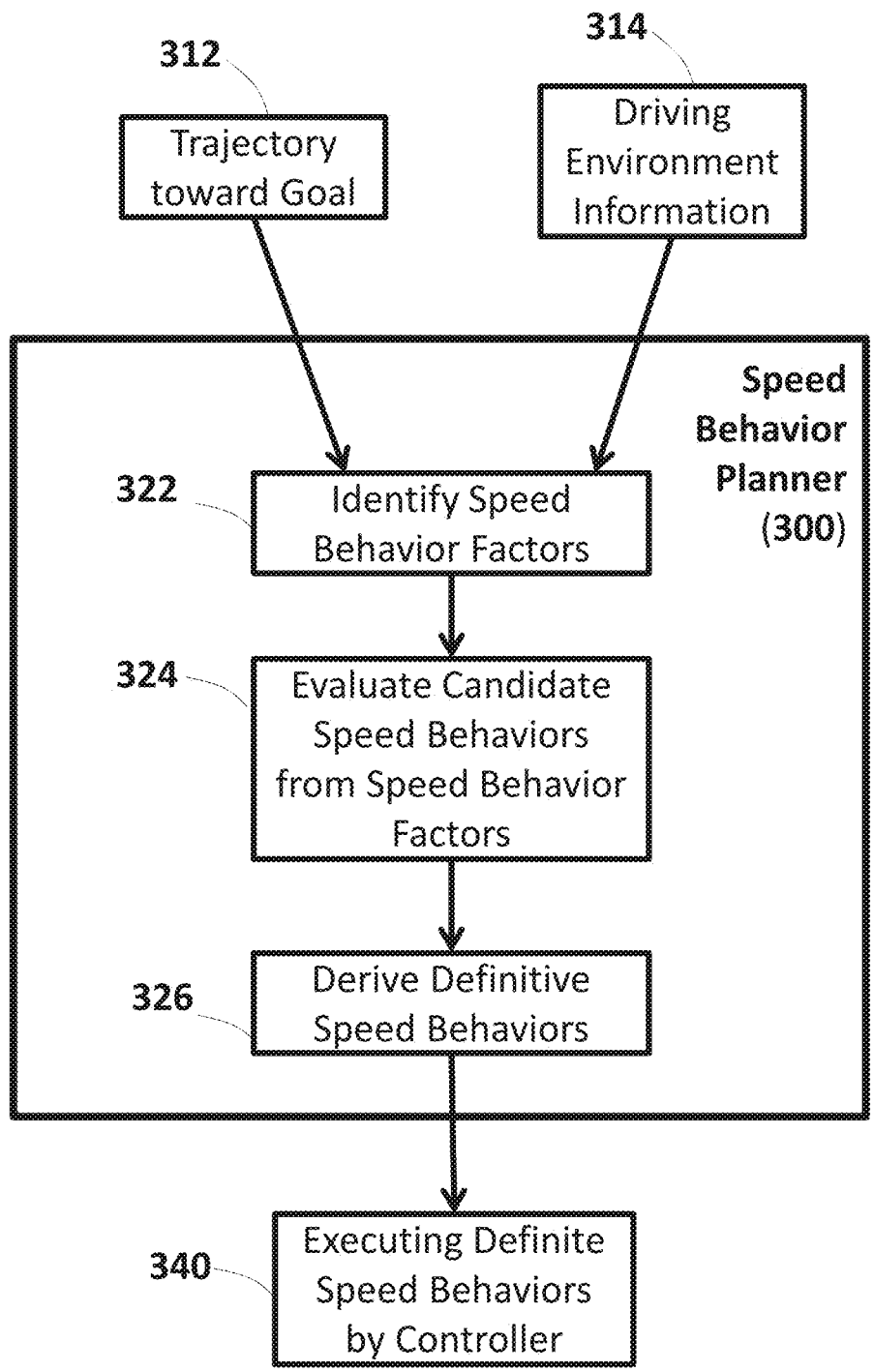
FIG. 3 shows an example of a speed behavior planning process.

Operations of the speed behavior planner (i.e., speed behavior planning) include multiple processes. Referring to FIG. 3, the speed behavior planner 300 may receive one or more trajectories towards the goal position 312. In some implementations, the speed behavior planner 300 may receive driving environment information 314, such as maps, static information, or dynamic information, or combinations of them. For each received trajectory, the speed behavior planner 300 may identify speed behavior factors 322 and their associated candidate speed behaviors (such as speed limits) 324.

In general, the speed behavior planner 300 can computationally analyze speed behavior factors or candidate speed behaviors, or both, to derive definitive speed behaviors 326. Details of the derivation will be described below.

Candidate speed behaviors (e.g., speed limits) specified by hard speed behavior factors, for example, the legal speed limit on a road, may be treated as hard maximum speeds. The definitive speed behaviors determined by the speed behavior planner 300 may involve lower than the maximum speeds specified by hard behavior factors.

Implementations of the speed behavior planner 300 may include outputting candidate speed behaviors or definitive speed behaviors. In some examples, a speed behavior may be a simple numerical speed value such as 65 mph. In some cases, a speed behavior may be determined computationally using an optimization process based on speed behavior factors, such as mechanical capabilities or driving environments, or both, of the AV system. Details of the computational analyses will be described below.

In some cases, identifying applicable speed behavior factors and evaluating corresponding speed behaviors may be combined in a single step. The output of the speed behavior planner can include, among other things, speed behaviors 340 that will be used to cause controllers of the AV to maneuver the AV in accordance with the speed behaviors.

Figure 4:
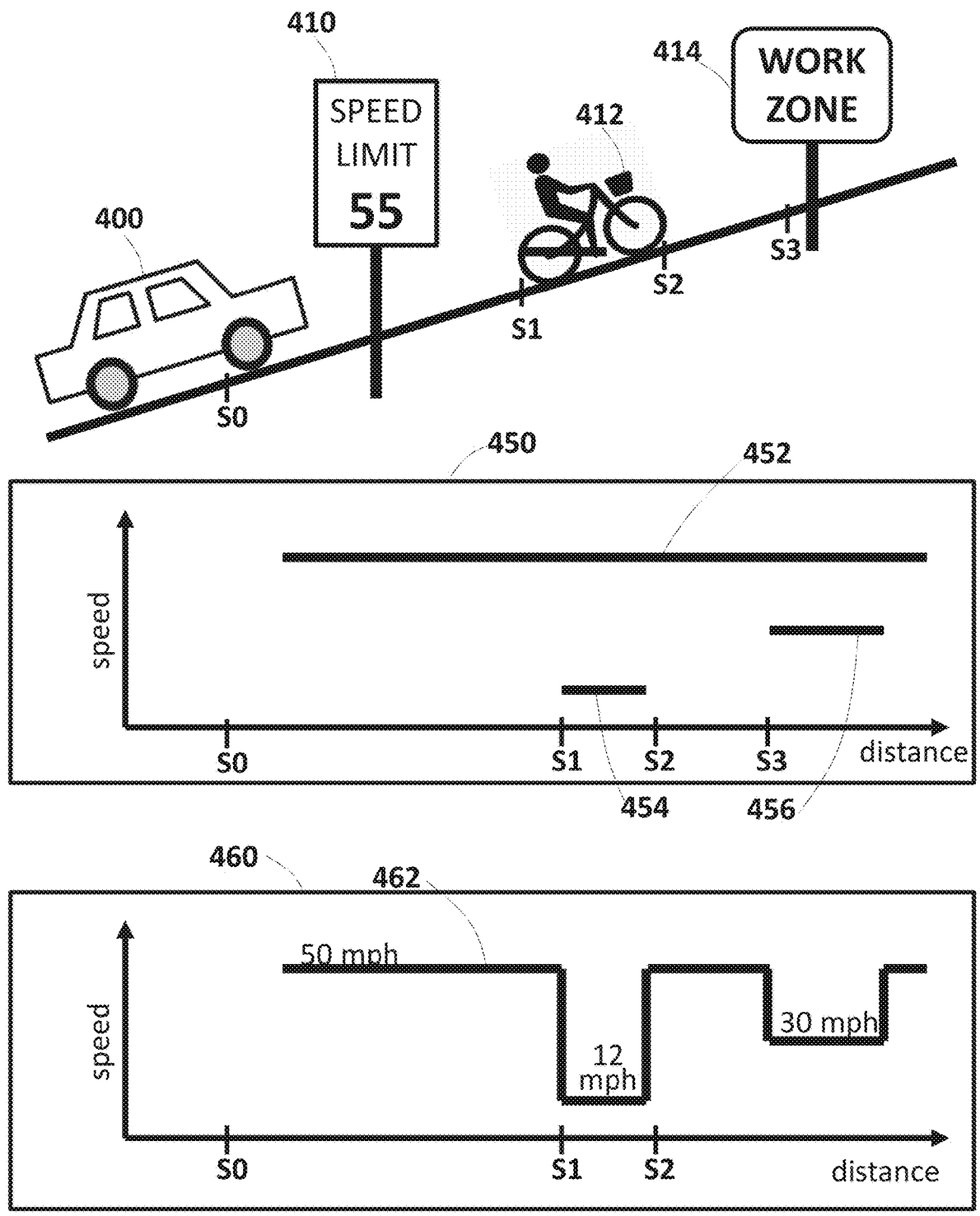
FIG. 4 shows an example of speed behavior factors and their speed behaviors.

FIG. 4 illustrates an example. The speed behavior planner may identify speed behavior factors and evaluate their possible impact on speed behavior. When the AV system 400 drives along a road, there may be a maximum speed limit specified by a sign 410 or indicated in a road database for that segment of the road. The perception processor of the AV system 400 may detect a bicyclist 412 riding in front of the AV system 400, so the maximum speed limit of the AV may be constrained by the bicyclist's speed, say 12 mph. Further down the road, there may be a work zone 414 where the road becomes narrower; the AV system 400 perceives the work zone, and the speed behavior planner evaluates the speed behavior factors to arrive at a candidate speed behavior that comprises an appropriate maximum speed limit, say, 30 mph. The three maximum speed limits can be visualized by a plot 450, where the line 452 represents the legally specified maximum speed limit of 55 mph, the bar 454 denotes the bicyclist speed of 12 mph, and the bar 456 corresponds to an analyzed appropriate maximum speed limit for the work zone of 30 mph.

A candidate speed behavior in the form of a maximum speed limit may apply to a long road segment or to a short road segment or to a single location. For example, in the plot 450 of the speed versus distance, the legal maximum speed limit 452 applies to the whole road. However, the maximum speed limits imposed by the bicyclist 454 and implied by the work zone 456 apply only to segments of the road in their vicinity. When considering all speed limits 452, 454 and 456, the speed behavior planner may derive candidate speed behaviors by selecting the minimum of the two maximum speed limits applicable at each location along the road, resulting in the aggregated candidate speed behavior 462 shown in the plot 460. The candidate speed behavior 462 is not a constant speed but rather a profile of different speeds.

In some implementations, the plots 450 and 460 may be presented as the speed versus time, by translating the speed in the spatial domain to the temporal domain. The translation may be based on the equation: distance=speed×time.

Figure 5:
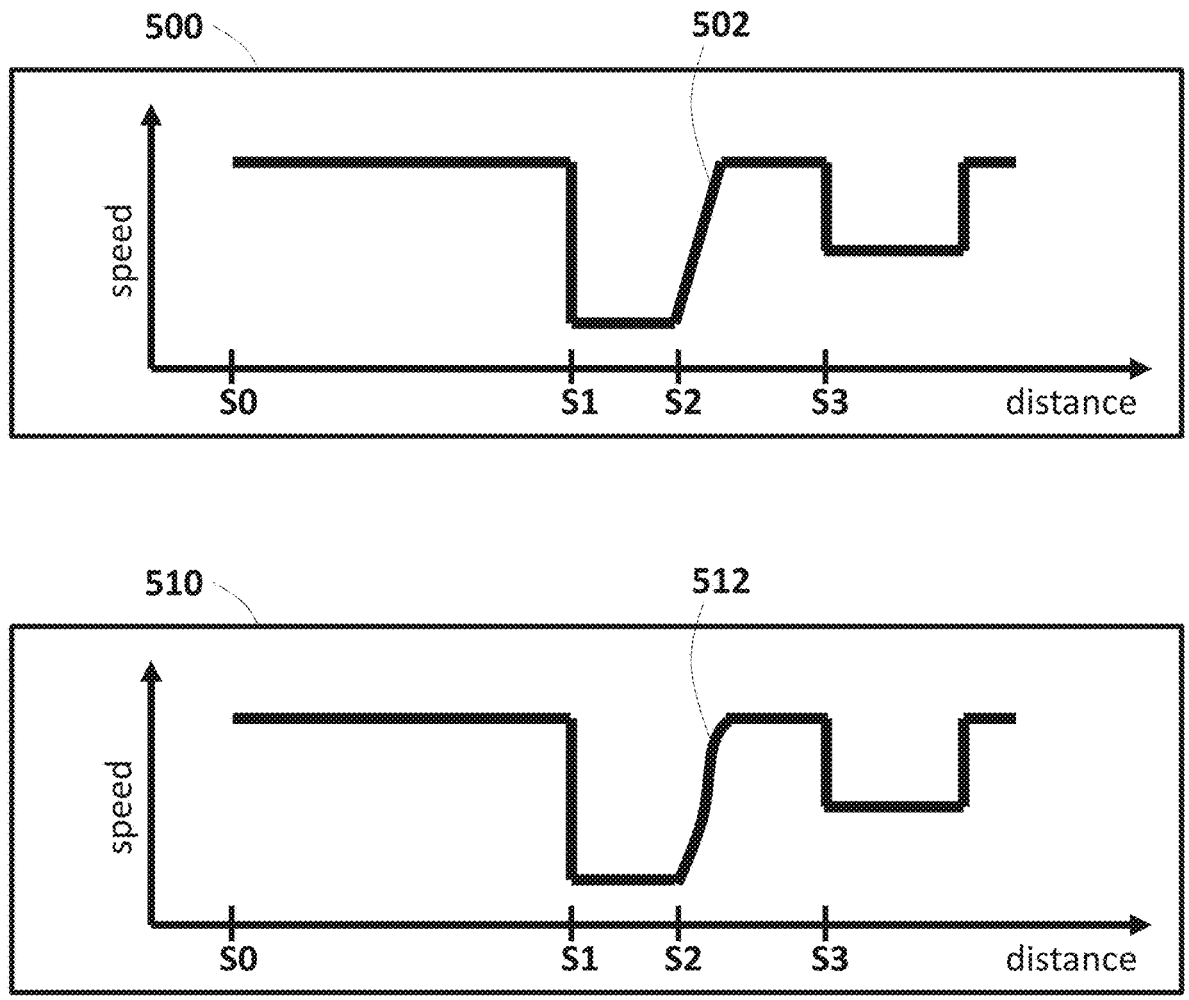
FIGS. 5-12 show examples of candidate speed behaviors and definitive speed behaviors.

Candidate speed behaviors can be adjusted in a wide variety of ways to form definitive speed behaviors. In some implementations, the speed behavior planner may derive definitive speed behaviors from candidate speed behaviors by smoothing speed discontinuities. We consider two types of discontinuities (step-up and step-down), and begin with addressing the step-up discontinuities. Referring again to FIG. 4, when a speed behavior factor no longer applies (e.g., when the AV system 400 passes the bicyclist 412 at S2), the maximum upper speed limit for the AV system may increase. For instance, the illustrated plot 460 shows a step-up discontinuity at location S2. The step-up discontinuity literally would require an infinite acceleration, which cannot be achieved mechanically. However, the inability of the AV to achieve the higher maximum speed limit right after the step-up discontinuity may not cause danger, because any speed under the higher maximum speed limit may be considered safe. Thus, in the absence of safety concerns, the speed behavior planner may or may not smooth the step-up discontinuity. If performed, the smoothing may utilize any of a wide variety of functions (e.g., a linear function, a nonlinear function, a quadratic function, a third or higher order function, a sigmoid, a hyperbolic function, or a logistic function, or another function, or a combination of them). The smoothing could also be done in ways not controlled by a particular mathematical function, for example, in response to changing behavior factors and non-numerical behavior factors. Referring to FIG. 5, the speed behavior plot 500 shows a linearly interpolated speed behavior 502 at S2; the speed behavior plot 510 shows a nonlinearly interpolated speed behavior 512.

Figure 6:
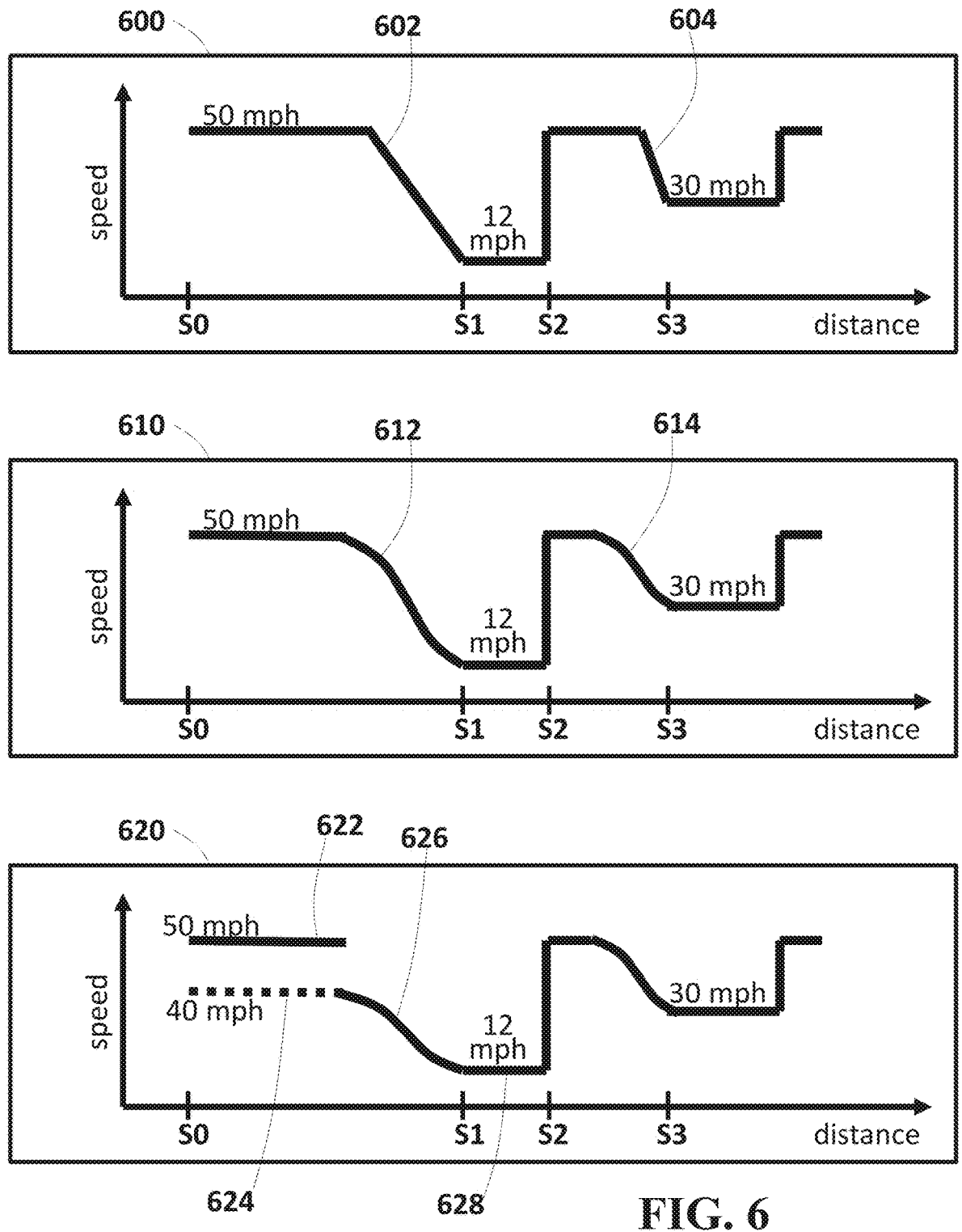

Some implementations of the adjustment of candidate speed behaviors to obtain definitive speed behaviors may handle step-down discontinuities. Referring again to FIG. 4, if the AV system 400 drives at the legal maximum speed limit (55 mph) between locations S0 and S1, upon reaching S1 it would suddenly need to drop the speed from 55 mph to 12 mph. However, such a sudden drop in speed would require the AV system to exert an infinite deceleration which is mechanically impossible. Moreover, at location S1 (the actual location of the bicyclist) if the AV system 400 cannot reduce the speed to the maximum speed limit imposed by the bicyclist 412, the AV may collide with the bicyclist. To avoid potential dangers, the derivation of the definitive speed behavior may include setting a smooth transition between speed limits, for example, a transition that occurs before the time or location at which the lower upper speed limit is to apply. Safety considerations can be more restrictive and more important in smoothing a step-down discontinuity than in smoothing a step-up discontinuity. For instance, the derivation may use any of a wide variety of functions (e.g., a linear function, a nonlinear function, a quadratic function, a third or higher order function, a sigmoid, a hyperbolic function, or a logistic function, or another function, or combinations of them) to interpolate (including smoothing) between speed limits. The interpolation could also be done in ways not controlled by a particular mathematical function, for example, in response to changing behavior factors and non-numerical behavior factors. Referring to FIG. 6, the speed behavior plot 600 uses a linear interpolation scheme, leading to linear constraints 602 and 604; the plot 610 shows a nonlinear interpolation scheme, resulting in smoother constraints 612 and 614.

Deriving definitive speed behaviors from candidate speed behaviors may include considering the current driving speed of the AV system. Referring to plot 620, for example, although the available maximum speed limit between S0 and S1 is 50 mph (622), the AV system may drive at the speed of 40 mph (624). Because encountering the following speed limit of 12 mph (628) is likely to directly force the AV to decelerate, the smoothing of the step-down discontinuity at S1 may disregard the available maximum speed limit 50 mph (622) but consider the current speed 40 mph (624) to make the interpolated speed behavior 626.

Deriving definitive speed behaviors may include considering a distance (or a time) associated with a speed behavior factor, or a speed limit specified by a speed behavior factor, or a speed specified by a speed behavior factor, or combinations of them.

Figure 7:
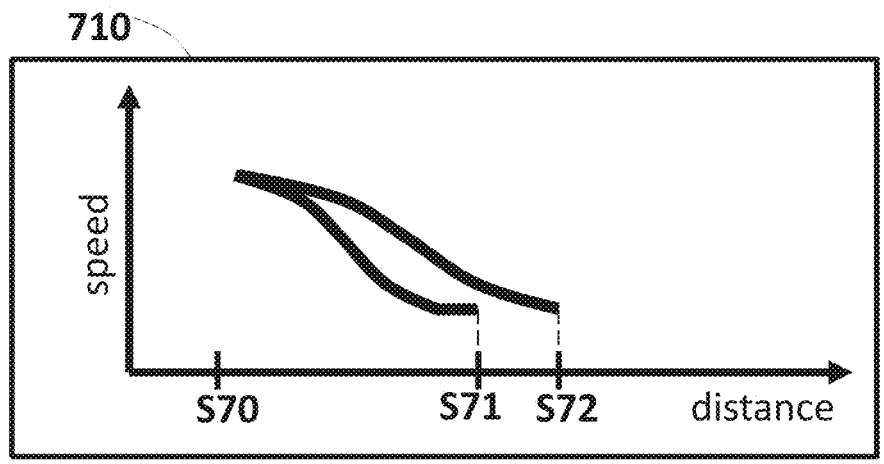
Figure 7:
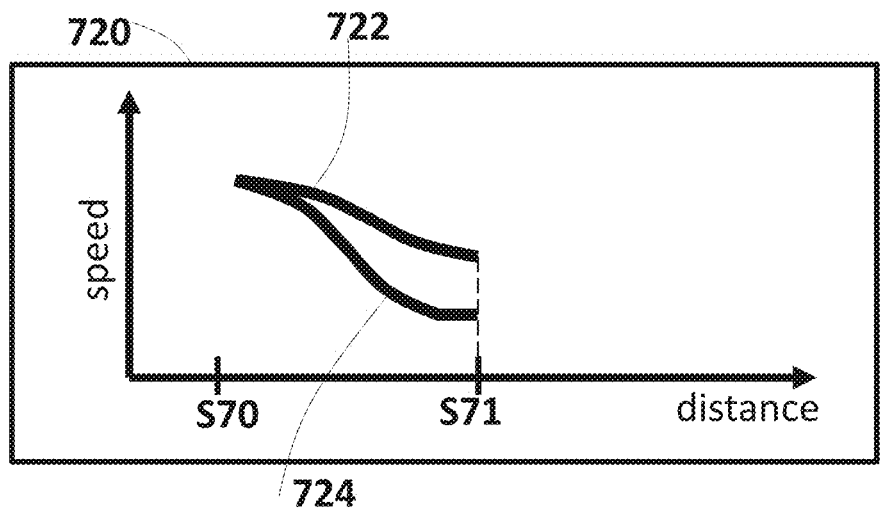
Figure 7:
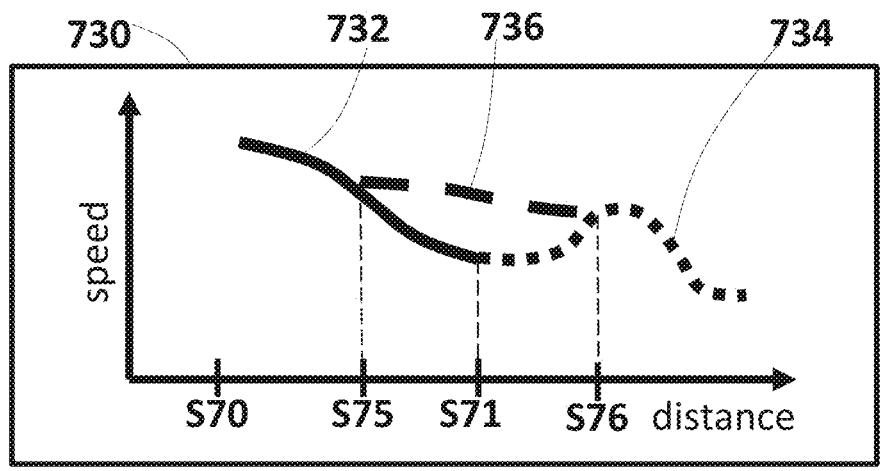

For example, the plot 710 in FIG. 7 shows the current location of the AV system at S70, a closer speed behavior factor S71 and a farther speed behavior factor S72. Because the speed behavior factor S71 is closer, the AV system may require faster deceleration to reach the maximum speed limit of the speed behavior factor S71 than to reach the maximum speed limit of the speed behavior factor S72.

For example, the plot 720 in FIG. 7 shows two different maximum speed limits at the location S71. The candidate speed behavior 722 leading to the higher upper speed limit can have slower deceleration than the candidate speed behavior 724 leading to the lower upper speed limit.

Moving objects in a driving environment may become speed behavior factors. The plot 730 in FIG. 7 illustrates an example. The AV system may be driving (say, 50 mph) at the location S70 and detect a moving object (e.g., another vehicle, a bicyclist, a pedestrian, an animal, or a toy) at S71 with a speed of, say, 35 mph. The speed behavior planner may determine a maximum speed limit (e.g., 35 mph) based on the speed of the moving object and generate a definitive speed behavior 732. Since both the AV system and the moving objects are in motion, the speed behavior planner may continue monitoring the speeds of the moving objects. For instance, the speed of a moving object may change, denoted by the dashed curve 734. Later, while the AV system is slowing down (say, down to 45 mph) and reaches the location S75, the moving object may be at location S76 with a speed of, say, 40 mph. Due to the speed change of the moving object, the AV system may adjust the definitive speed behavior by changing the maximum speed limit to produce a new definitive speed behavior 736. The speed behavior planner may choose the new definitive speed behavior 736 and discard the old definitive speed behavior 732; in some cases, the old definitive speed behavior 732 may be preferable (e.g., due to safety concern), and the new definitive speed behavior 736 is discarded.

Figure 8:
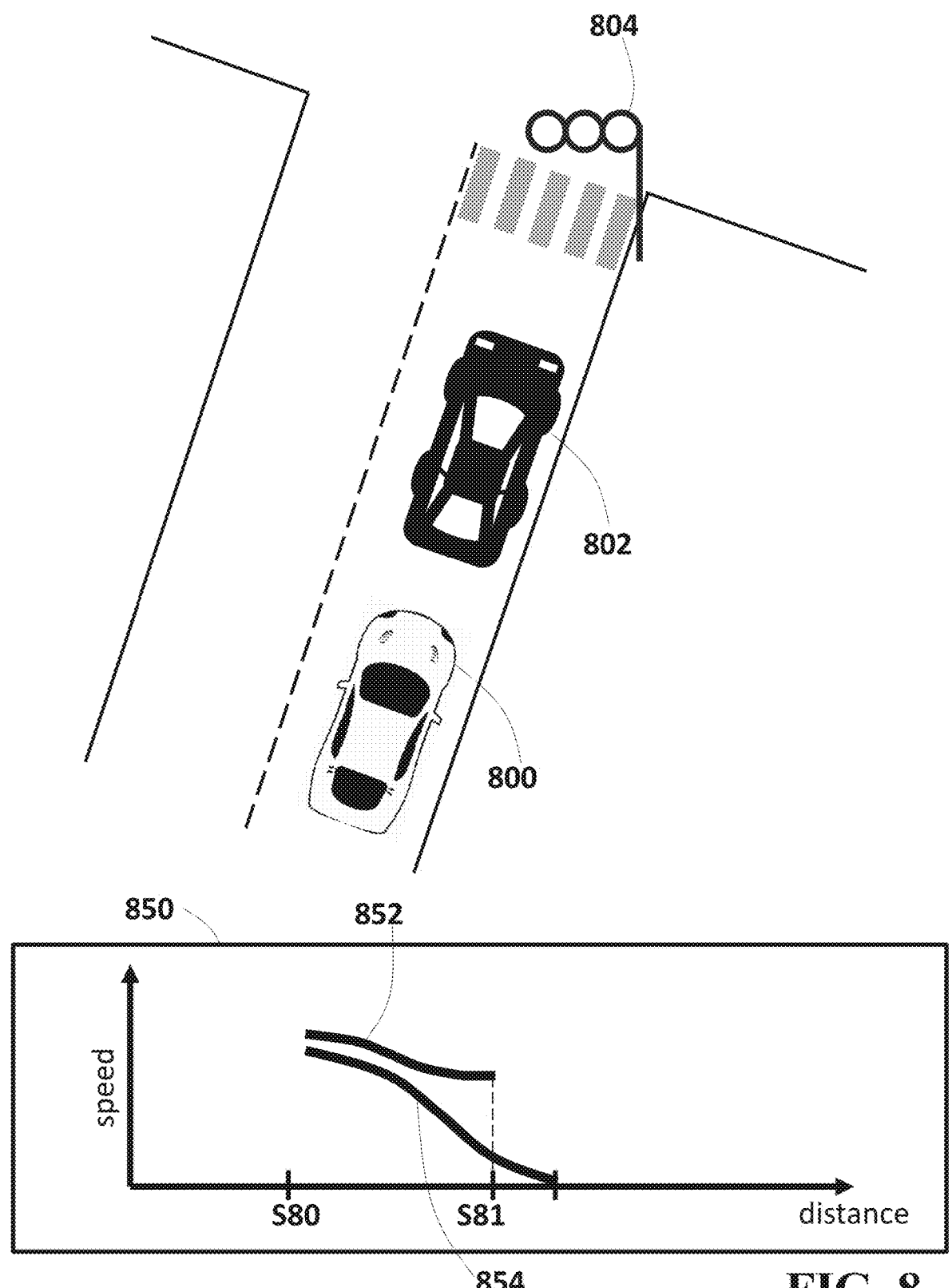

In some implementations, the AV system may encounter two or more speed behavior factors within a road segment. For example in FIG. 8, as the AV system 800 approaches a leading vehicle 802, it would need to slow down to the speed of, or to a speed lower than the speed of, the leading vehicle 802, as illustrated by a candidate speed behavior 852 in the plot 850. Meanwhile, the AV system 800 may detect a red light 804, which would require the AV to stop as illustrated by the candidate speed behavior 854. As illustrated in the plot 850, the two candidate speed behaviors 852 and 854 may simultaneously apply, e.g., overlap, between locations S80 and S81. The speed behavior planner can choose between the two candidate speed behaviors in setting a definitive speed behavior. To account for safety, the candidate speed behavior with a lower speed (e.g., 854 in FIG. 8) may override other candidate speed behaviors.

Figure 9:
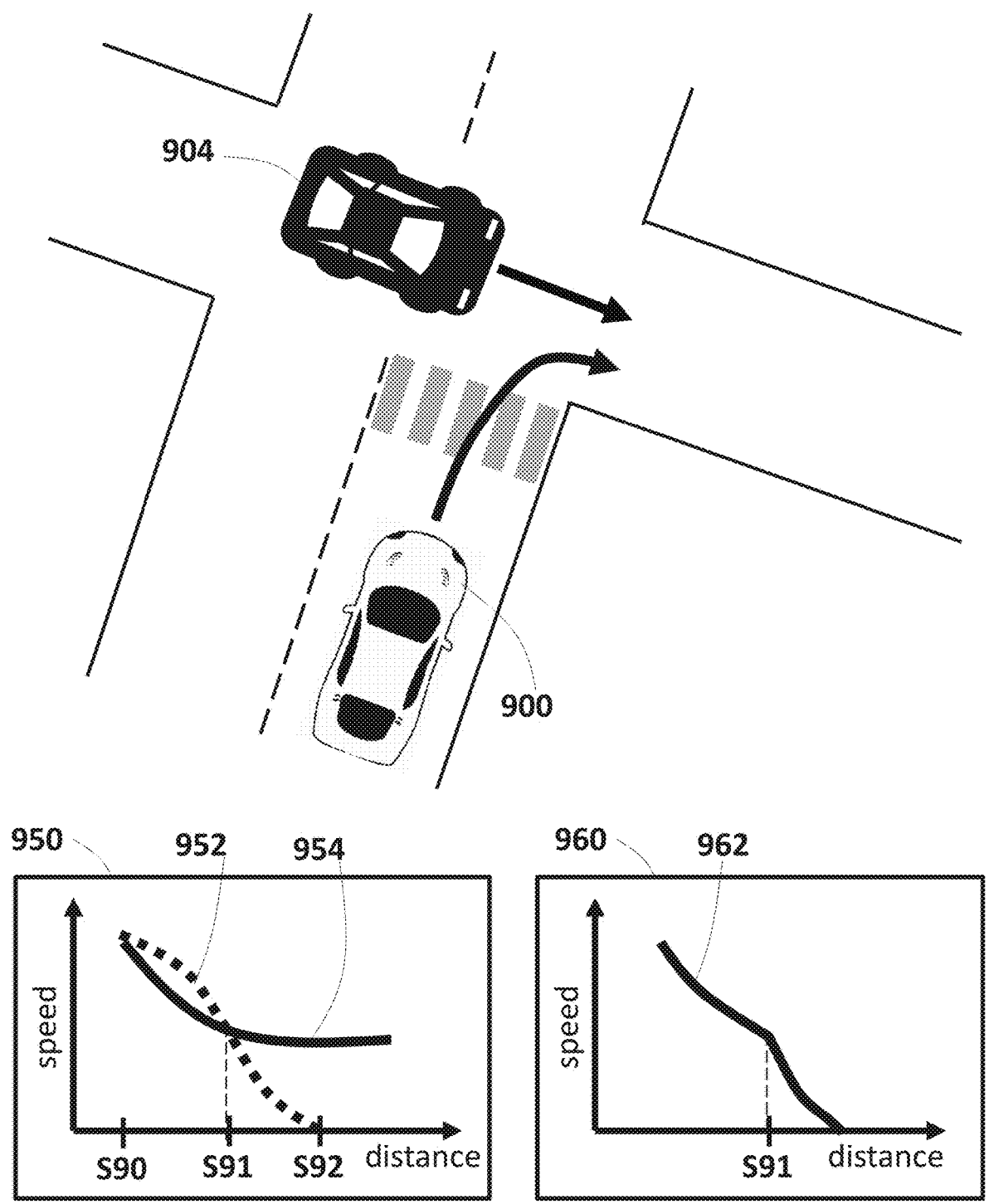

In some implementations, two or more candidate speed behaviors may cross. Referring to FIG. 9, for instance, a given trajectory may cause the AV system 900 to make a right turn, which may cause a candidate speed behavior 954 to slow the AV system to a lower speed. Meanwhile, another vehicle 904 may appear causing the speed behavior planner to generate another candidate speed behavior 952. To avoid colliding with the vehicle 904, the candidate speed behavior 952 may constrain the AV system 900 to swiftly decelerate. Since the two candidate speed behaviors cross at location S91, the speed behavior planner may aggregate (e.g., form a composite of) both candidate speed behaviors by selecting their lower-speed segments; i.e., between S90 and S91 the candidate speed behavior 954 may override the other, and between S91 and S92 the candidate speed behavior 952 may override the other, resulting in the aggregated definitive speed behavior 962 shown in the plot 960.

In general, the speed behavior planner may perform a wide variety of operations to form a definitive speed behavior from two or more other candidate speed behaviors that would apply at a given location of segment of locations.

In some implementations, the behavior planning process may include a queuing process. Referring to the plot 950, when the AV system is at S90, the speed behavior planner may use a queue to hold the two candidate speed behaviors 952 and 954. When the AV system drives along the road, the speed behavior planner may examine the current queue to optimally determine which candidate speed behavior, or which portions of candidate speed behaviors, to use as the definitive speed behavior based on a criterion, such as which candidate speed behavior is the most restrictive. For example, during S90 and S91 the speed behavior planner may check the queue to choose the candidate speed behavior 954, and during S91 and S92 choose the candidate speed behavior 952. Other criteria could be used for making the choice. And the queuing process could apply to more than two different candidate speed behaviors.

Implementations of the speed behavior planning process may include generating candidate speed behaviors and definitive speed behaviors that are feasible and appropriate and can be followed by the AV system. Although the speed behavior derivation may remove discontinuities in candidate speed behaviors, driving the AV system according to a given candidate speed behavior may cause discomfort or mechanical breakdown. For example, if the AV system drives at a speed following exactly the candidate speed behavior 962 in the plot 960, its deceleration will exhibit a discontinuity at the location S91. Thus, speed behavior planner may generate a definitive speed behavior by smoothing acceleration and deceleration. For this purpose, the speed behavior planner can store criteria and rules that define features of a feasible speed behavior and apply them in forming a definitive speed behavior.

In some implementations, speed behavior planning may include an optimization algorithm. Optimization may search for definitive speed behavior for a road segment where multiple speed behavior factors exist. For example, discontinuities may exist across candidate speed behaviors, and an optimization algorithm may be invoked to remove the discontinuities. In some instances, during a road segment or a time period, two or more candidate speed behaviors may cross, so an optimization algorithm may be invoked to identify optimal speed behaviors throughout the road segment.

The optimization may treat a speed behavior factor as a hard speed behavior factor or a soft speed behavior factor, or a partially hard speed behavior factor and a partially soft speed behavior factor. For example in FIG. 10, a candidate speed behavior (solid line 1002) is derived in the plot 1000. When treating a speed behavior as a hard speed behavior factor, an optimally generated definitive speed behavior (e.g., dashed line 1004 or 1008) can never exceed the hard speed behavior factor. For a speed behavior factor that is treated as a soft speed behavior factor, the optimal definitive speed behavior (e.g., dashed line 1006) may partially exceed the candidate speed behavior, although the entire definitive speed behavior preferably stays below the candidate speed behavior associated with the soft speed behavior factor.

Implementations of the optimization algorithm may relax a given speed behavior factor. In some cases, treating a speed behavior factor as a hard speed behavior factor may result in no solution in the optimization step. When no solution can be found, the optimization algorithm may relax the hard speed behavior factor; for example, the speed behavior instead may be treated as a soft speed behavior factor. In some implementations, one or more portions of the speed behavior factor may be treated as a soft speed behavior factor. In some applications, an entire speed behavior factor may be treated as a soft constraint.

Implementations of the optimization algorithm executed by the speed behavior planner may consider global or local smoothness in speed, acceleration (i.e., first derivative of the speed with respect to time), jerk (i.e., second derivative of the speed with respect to time), jounce (i.e., third derivative of the speed with respect to time), snap (i.e., fourth-order derivative of the speed with respect to time), crackle (i.e., fifth-order derivative of the speed with respect to time), or another higher-order derivative of the speed with respect to time, or combinations of them.

Implementations of the optimization algorithm may search for a definitive speed behavior that is close to a given speed behavior. For instance in FIG. 10, the speed behavior 1008 may be a better solution than the speed behavior 1004 during the optimization process. Similarly, the speed behavior 1006 may be a better solution than the speed behavior 1008 because the speed behavior 1006 deviates from the speed behavior 1002 less than does the speed behavior 1008. However, if the optimization enforces a hard constraint on speed behaviors, then the speed behavior 1008 may be a better solution than the speed behavior 1006.

Implementations of the optimization algorithm may consider minimizing a driving time, which may be expressed as a function of speed. For example, based on the relation distance=speed×time, speed and time are inversely proportional. Thus, when comparing two candidate speed behaviors 1004 and 1008 in the plot 1000, the candidate speed behavior 1008 takes less time than the candidate speed behavior 1004 to arrive the goal location S100, so the candidate speed behavior 1008 may become preferred definitive speed behavior. In another illustration, the speed behaviors may be represented in time domain, such as the plot 1010 of FIG. 10. Two candidate speed behaviors 1012 and 1014 may be generated. The candidate speed behavior 1012 may take more time to stop the AV system than the candidate speed behavior 1014. When minimizing the driving time, the candidate speed behavior 1014 is a preferred solution (definitive speed behavior) in the optimization.

Implementations of the optimization algorithm may consider maximizing a driving distance, which may be expressed as a function of speed. When treating time as a constant variable, the relation distance=speed×time implies that searching for a speed behavior close to a speed limit set by a speed behavior factor is equivalent to maximizing the driving distance. For example, given a time period (e.g., 5 seconds) to drive the AV system, the optimization algorithm may maximize distance to identify optimal definitive speed behaviors. Referring to the plot 1010, given a time period till T100, maximizing the distance is to maximize the area under the curve of the speed behavior, so the candidate behavior 1012 is a preferred solution (definitive speed behavior) in the optimization.

Figure 10:
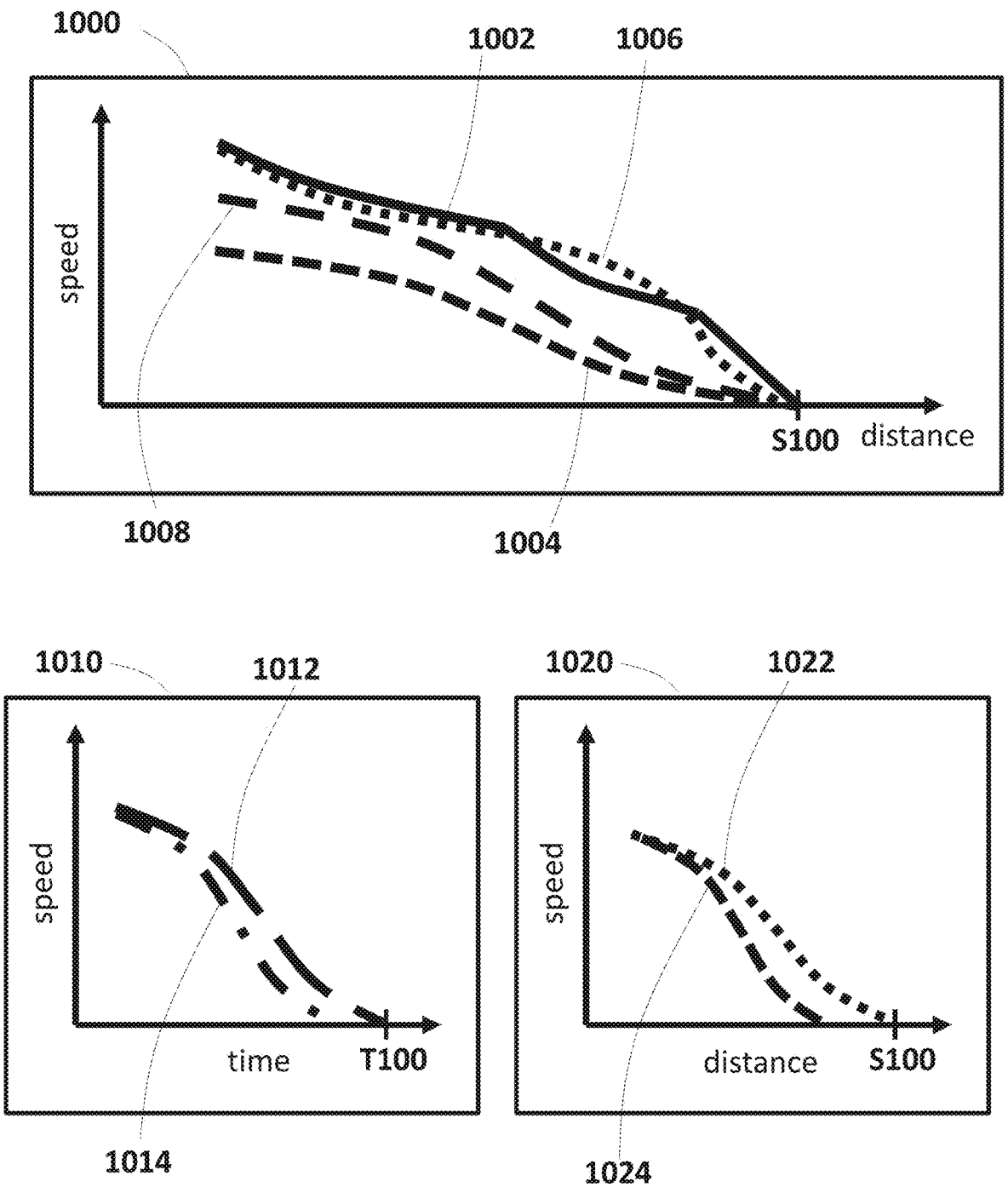

Another illustration is based on the plot 1020 of FIG. 10. A speed behavior factor at S100 may require the AV system to stop. Two candidate speed behaviors 1022 and 1024 may be generated. The candidate speed behavior 1022 may stop the AV system nearly in front of the location S100, but the candidate speed behavior 1024 may lead the AV system to slow down more quickly and stop ahead of the location S100. When maximizing the driving distance, the candidate speed behavior 1022 is a preferred solution (definitive speed behavior) in the optimization.

Figure 11:
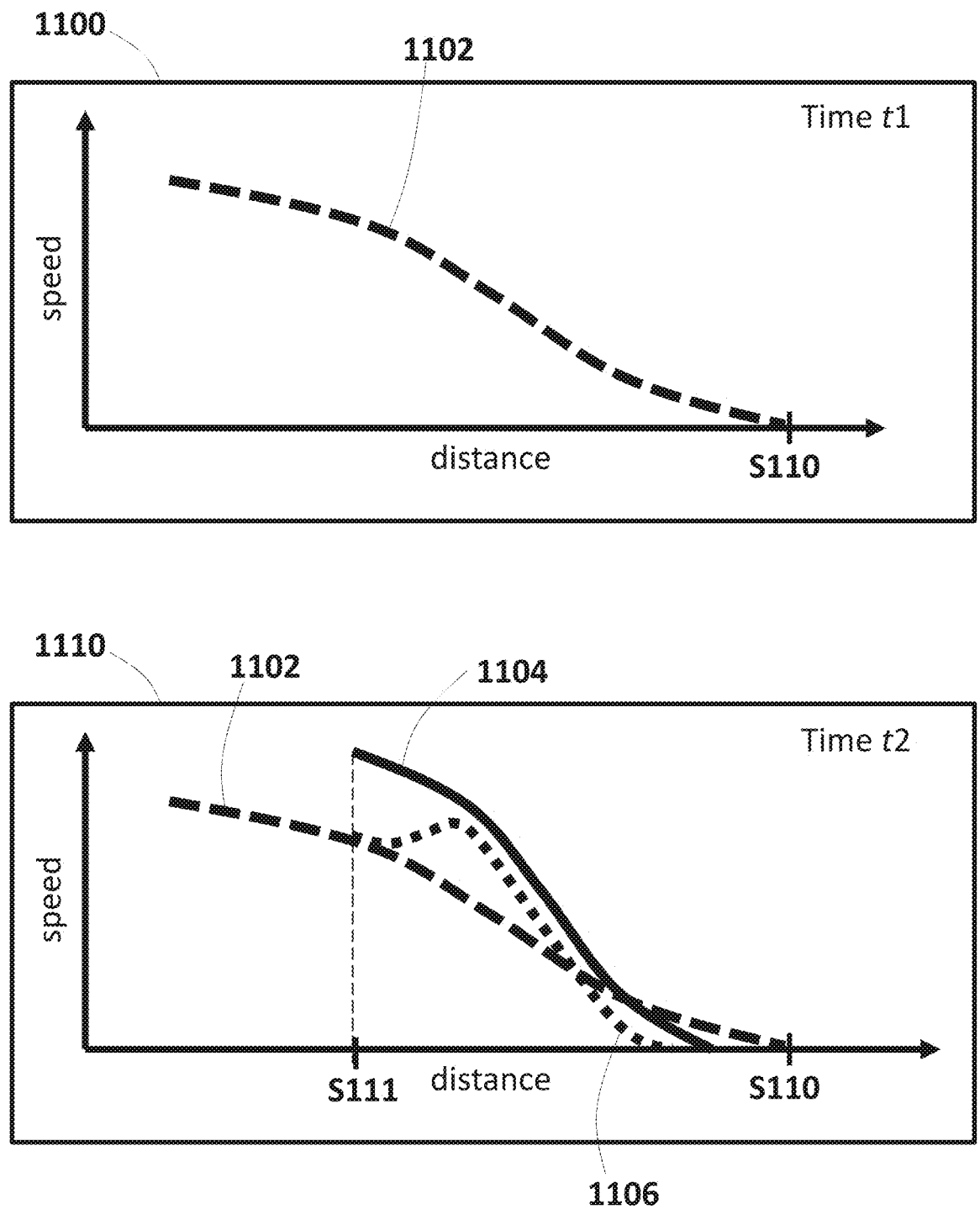

Implementations of the optimization algorithm may consider past speed behaviors or previously generated definitive speed behaviors, or both. FIG. 11 illustrates an example. At time t1, the plot 1100 shows a speed behavior factor S110 that leads to a definitive speed behavior 1102 for the AV system to follow. At a later time t2, the AV system reaches the location S111, as shown in plot 1110; a new candidate speed behavior 1104 may be derived, and the speed behavior planner may be triggered to search for another optimal definitive speed behavior. In this example, the optimization may consider the current driving speed at location S111 and generate a new definitive speed behavior 1106. Starting at the location S111, the AV system may discard the old definitive speed behavior 1102 and follow the new definitive behavior 1106.

Implementations of the optimization algorithm may use linear programming or nonlinear programming or dynamic programing, or combinations of them.

In some implementations, the speed behavior planning may repeatedly execute the tasks and processes described above; the repetition may occur in time or in space or both. The speed behavior planning process may discretize the time domain. Thus, the execution of the planning process may be performed in at least or at most 1 Hz, 2 Hz, 3 Hz, 4 Hz, 5

Figure 12:
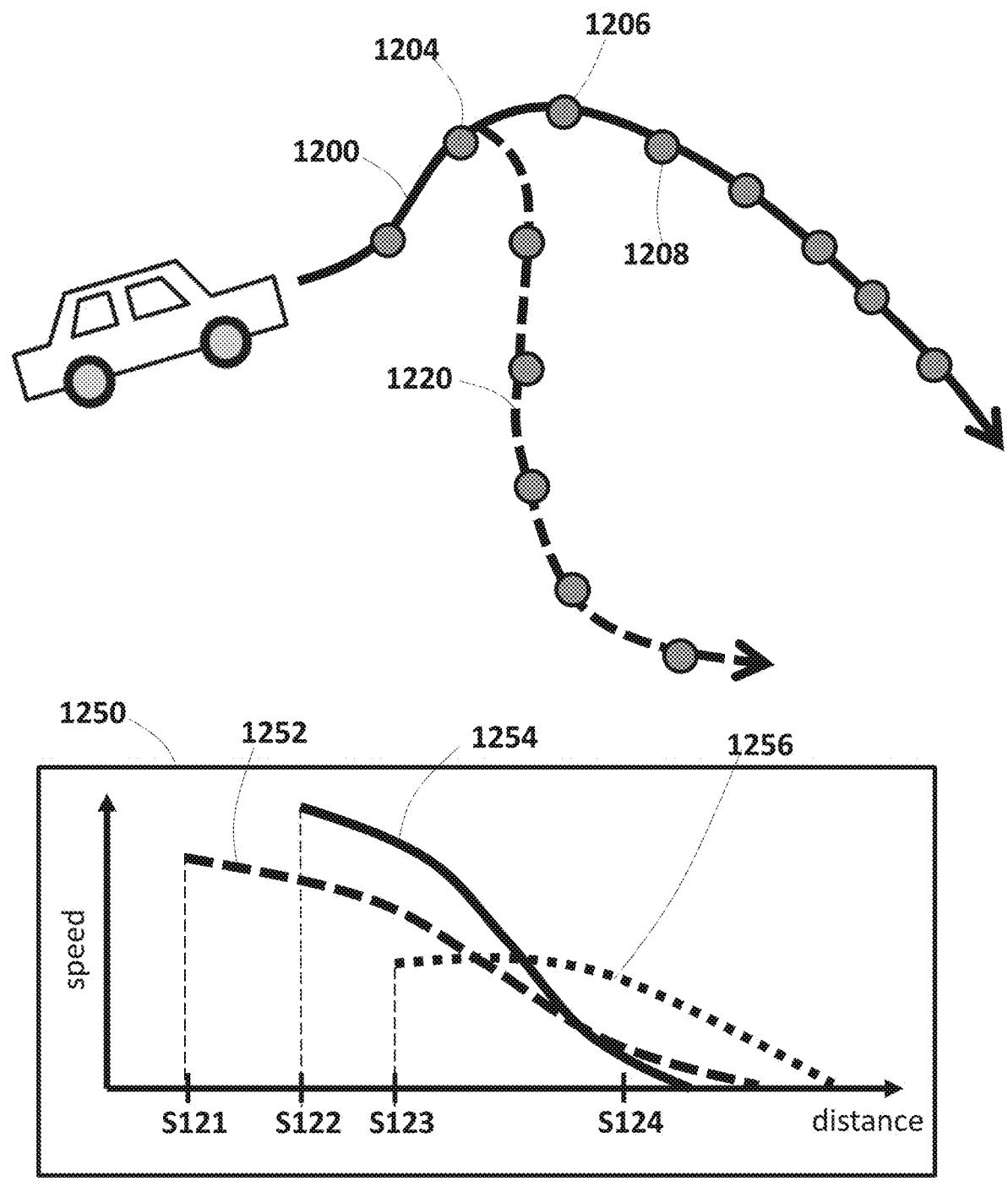

Hz, 10 Hz, 15 Hz, 20 Hz, 30 Hz, 40 Hz, 50 Hz, 60 Hz, 70 Hz, 80 Hz, 90 Hz, 100 Hz, 200 Hz, 300 Hz, 400 Hz, 500 Hz, 600 Hz, 700 Hz, 800 Hz, 900 Hz, or 1 k Hz. Similarly, the speed behavior planning process may discretize the spatial domain. Referring to FIG. 12, when given a trajectory 1200, the speed behavior planning may discretize the trajectory 1200, and execute the speed behavior planning with respect to each of the discretized spatial points (e.g., 1204, 1206 and 1208). The identification of speed behavior factors may be performed each time AV is approaching the next 1, 2, 3, 4, 5, 6, 7, 8, 9, or 10 spatial points. The points that result from the discretization may be evenly spaced or randomly spaced, or both. The distance between two adjacent discretized points may be at least or at most 1 cm, 5 cm, 10 cm, 20 cm, 30 cm, 40 cm, 50 cm, 60 cm, 70 cm, 80 cm, 90 cm, 1 m, 5 m, or 10 m.

In some implementations, the speed behavior planner may plan the speed behavior (e.g., search for candidate speed behavior or definitive speed behavior or both) of the AV system for the following road segment (e.g., at least or at most 1 cm, 5 cm, 10 cm, 20 cm, 30 cm, 40 cm, 50 cm, 60 cm, 70 cm, 80 cm, 90 cm, 1 m, 5 m, or 10 m). In some implementations, the speed behavior planner may plan the speed behavior (e.g., search for candidate speed behavior or definitive speed behavior or both) of the AV system for the following time period (e.g., at least or at most 1 second, 2 seconds, 3 seconds, 4 seconds, 5 seconds, 6 seconds, 7 seconds, 8 seconds, 9 seconds, 10 seconds, 20 seconds, 30 seconds, 40 seconds, 50 seconds, 60 seconds, 70 seconds, 80 seconds, 90 seconds, 100 seconds, 110 seconds, or 120 seconds). Given a planned speed behavior and a planned trajectory, the speed behavior planner may monitor if the AV system follows the planned speed behavior on the planned trajectory. If there is a deviation, the motion controller of the AV system may include a feedback control mechanism to maneuver the AV system to follow the planned speed behavior or the planned trajectory or both.

In some implementations, the speed behavior planner may receive two or more trajectories from the motion planner. The two or more trajectories may be independent, in parallel, crossing each other, merging, or bifurcating, or combinations of them. For instance, FIG. 12 shows two trajectories bifurcating from trajectory 1220 at the point 1204. The speed behavior planning may be performed on each of the two trajectories. In some cases, if the AV system picks one of multiple trajectories (e.g., 1200) to drive along, the candidate and definitive speed behaviors derived from other trajectories (e.g., 1220) may be discarded. During this process, the speed behavior planner may consider one or more speed behaviors (which may include candidate speed behaviors or definitive speed behaviors or both) along each of given trajectories, and transmit the speed behaviors to the motion planner. The motion planner may use the speed behaviors to optimally determine which trajectory is the preferable one for the AV system to drive. In other words, in some implementations, it is the motion planner rather than the speed behavior planner that ultimately chooses a definitive trajectory from among two or more candidate trajectories.

In some implementations, the speed behavior planning may include a queuing process. Referring to the plot 1250, assume the trajectory is discretized, and the discretization points are S121, S122, S123 and S124. When the AV system reaches S121, a new candidate speed behavior 1252 may be derived. When the AV system reaches S122, another new candidate speed behavior 1254 may be derived. The speed behavior planner may consider the most restrictive candidate speed behavior (i.e., 1252), and discard others. In some cases, rather than discarding the less restrictive candidate speed behaviors, the speed behavior planner may place them in a queue for future use. For instance, the AV system may reach a farther location S123, where a new candidate speed behavior 1256 is generated. The queue may store the candidate speed behaviors 1256, 1252 and 1254. The order of the speed behaviors in a queue may be random or be based on a measure. For example, the queue may order the candidate speed behaviors from a lowest score (e.g., based on speed, time, distance, acceleration, or jerk, or combinations of them) to a highest score, or vice versa. In the plot of 1250, at S123 the queue may be configured to hold the candidate speed behaviors in the order 1256, 1252 and 1254, but the queue may be reordered in the order 1254, 1252 and 1256 at location S124.

In some implementations, the speed behavior planning may include optimizing definitive lateral speed behavior. A trajectory may contain a curved portion (e.g., a curve, a turn, or a U-turn), such as the 1204-1206-1208 trajectory ranging from in FIG. 12 where the speed behavior will have lateral components. Any technology disclosed in this document can be applied to search for definitive lateral speed behavior. The speed behavior planning may optimize longitudinal and lateral speed behaviors together in an optimization solver, or in two different optimization solvers.

In some implementations, the planning process may not always operate in a specified temporal or spatial frequency. In some cases, the planning process may be triggered upon a moving object being detected in the driving environment. Other speed behavior factors may include mechanical issues, special road features (e.g., ascending, descending, potholes, or curvatures, or combinations of them), or special requests (e.g., hailing, rider requests, server requests, teleoperator requests, or police actions, or combinations of them) or combinations of them.

Figure 13:
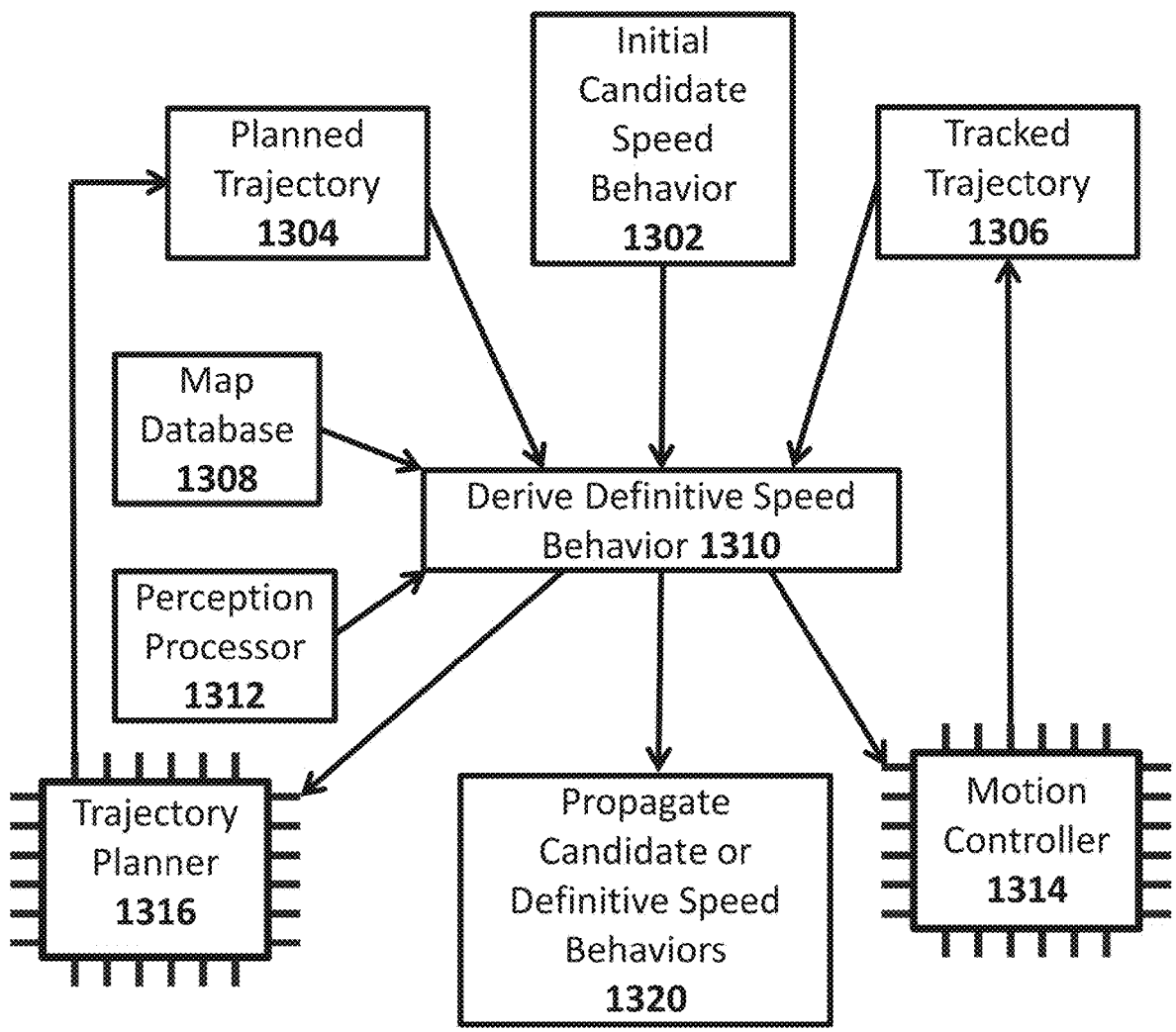
FIG. 13 shows an example of a processing flow of a speed behavior planner.

FIG. 13 shows an exemplary processing flow of the speed behavior planner. The speed behavior planner may initialize a set of candidate speed behaviors (1302), which may be empty. The speed behavior planner may receive static driving information (e.g., from map database 1308) or dynamic driving information (e.g., from perception processor 1312), or both. The speed behavior planner may be given one or more planned trajectories (1304). In some cases, a given trajectory may have been coupled with static or dynamic or both driving information, or speed behavior factors, or past or current or future speed behaviors, or combinations of them. For example, a trajectory planner may use a map to label, along a trajectory, locations of speed limits, traffic lights, traffic signs, or lane marks, which provide prior information of candidate speed behaviors. The speed behavior planner may use the various information to generate candidate speed behaviors (1310) on the given trajectories. In some implementations, the outputs may be transmitted to a trajectory planner 1316, which may evaluate the candidate speed behaviors to adjust the planned trajectories 1304. In some implementations, the outputs may be transmitted to a motion controller 1314, which may control the AV system to drive at a speed tracking the speed behaviors along the planned trajectories. The AV system may log the tracked trajectories 1306, and the speed behavior planner may use the tracked trajectories in the speed behavior planning process.

At the last step 1320, the results of the speed planning process may be propagated to the next iteration and become part of the initial set of candidate speed behaviors. The iteration may continue till the AV system reaches the goal position.

Other implementations (e.g., methods, software, mobile applications, operating systems, user interfaces, simulations, video games, hardware, electronics devices, global position systems, electronic circuits, field programmable gate arrays, or application specific integrated circuits, or combinations of them) are also within the scope of the claims.

The invention claimed is:

1. A method comprising:
receiving, by one or more processors, signals from one or more sensors over a period of time, wherein each signal represents current information about a speed behavior factor indicative of a current speed behavior of a vehicle being driven;
determining, by the one or more processors and based on the signals, a function representing an amount of jerk of the vehicle over the period of time;
optimizing, by the one or more processors and using a second derivative of a speed of the vehicle and another speed behavior factor, the function to determine a plurality of candidate speed behaviors associated with the speed behavior factor by concatenating speed limits along a trajectory;
deriving, by the one or more processors, a definitive speed behavior by using the plurality of candidate speed behaviors, wherein the deriving includes smoothing at least one speed discontinuity between two concatenated speed limits along the trajectory; and
operating, by the one or more processors, a driving component of the vehicle in accordance with the definitive speed behavior.

2. The method of claim 1, in which the other speed behavior factor comprises a non-numerical speed behavior factor.

3. The method of claim 1, in which the speed behavior factor comprises one or more of a legal specification for speed requirement at a particular point in a trajectory of the vehicle or a user preference indicating a preferred maximum speed of the vehicle while the vehicle is on the trajectory, wherein the speed behavior factor further comprises one or more of the following: a moving object, an event, a mechanical limitation of the vehicle, a condition of a vehicle component, a weather condition, an occlusion, or a road feature.

4. The method of claim 1, in which the plurality of candidate speed behaviors comprises a plurality of speed limits, wherein the definitive candidate behavior is a particular speed limit determined based on the plurality of speed limits.

5. The method of claim 1, in which the candidate speed behaviors are determined for a trajectory on which the vehicle is being driven, wherein the definitive speed behavior is determined for the trajectory.

6. The method of claim 1, in which at least one of the optimizing to determine the plurality of candidate speed behaviors or the deriving of the definitive speed behavior is performed in a spatial domain or a time domain or both.

7. The method of claim 1, in which determining the plurality of candidate speed behaviors comprises identifying a minima of aggregation of one or more speed limits.

8. The method of claim 1, wherein the deriving of the definitive speed behavior by using the plurality of speed behaviors comprises:

selecting, by the one or more processors, the definitive speed behavior from the adjusted plurality of candidate behaviors.

9. The method of claim 1, wherein the deriving of the definitive speed behavior by using the plurality of speed behaviors comprises:
using a queueing process to hold and arrange the plurality of candidate speed behaviors in a queue, wherein the plurality of candidate speed behaviors are arranged in the queue according to at least one of time or space; and
selecting the definitive speed behavior from the queue.

10. The method of claim 1, in which deriving the definitive speed behavior comprises analyzing past driven speed behaviors among the plurality of candidate speed behaviors.

11. The method of claim 1, in which deriving the definitive speed behavior comprises analyzing past speed behaviors among the plurality of candidate speed behaviors.

12. The method of claim 1, in which deriving the definitive speed behavior comprises analyzing a current speed of the vehicle.

13. The method of claim 1, in which deriving the definitive speed behavior comprises maximizing a driving distance of the vehicle.

14. The method of claim 1, in which deriving the definitive speed behavior comprises minimizing a driving time.

15. The method of claim 1, wherein the driving component of the vehicle is one or more of an acceleration component, a steering component, or a deceleration component.

16. The method of claim 1, further comprising displaying a visualization of the definitive speed behavior.

17. A vehicle comprising:
driving components including an acceleration component, a steering component, and a deceleration component;
a planning component to:
receive signals from one or more sensors over a period of time, wherein each signal represents current information about a speed behavior factor indicative of a current speed behavior of the vehicle,
determine, based on the signals, a function representing an amount of jerk of the vehicle over the period of time;
optimize, using a second derivative of a speed of the vehicle and another speed behavior factor, the function to determine a plurality of candidate speed behaviors associated with the speed behavior factor by concatenation of speed limits along a trajectory; and
derive a definitive speed behavior based on the plurality of candidate speed behaviors, wherein the derivation includes smoothing at least one speed discontinuity between two concatenated speed limits along the trajectory; and
a command component to cause at least one of the driving components to move the vehicle according to the definitive speed behavior.

18. An apparatus comprising:
a storage for instructions; and
one or more processors that, when provided the instructions, operate in accordance with the instructions to perform operations comprising:
receiving signals from one or more sensors over a period of time, wherein each signal represents current information about a speed behavior factor indicative of a current speed behavior of a vehicle being driven;

determining, based on the signals, a function representing an amount of jerk of the vehicle over the period of time;
optimizing, using a second derivative of a speed of the vehicle and another speed behavior factor, the function to determine a plurality of candidate speed behaviors associated with the speed behavior factor by concatenating speed limits along a trajectory;
deriving a definitive speed behavior by using the plurality of candidate speed behaviors, wherein the deriving includes smoothing at least one speed discontinuity between two concatenated speed limits along the trajectory; and
operating a driving component of the vehicle in accordance with the definitive speed behavior.

* * * * *

UNITED STATES PATENT AND TRADEMARK OFFICE
CERTIFICATE OF CORRECTION

PATENT NO. : 11,126,177 B2  
APPLICATION NO. : 15/879015  
DATED : September 21, 2021  
INVENTOR(S) : Dmytro S. Yershov et al.

Page 1 of 1

It is certified that error appears in the above-identified patent and that said Letters Patent is hereby corrected as shown below:

On the Title Page

Item (56), Column 2 (other publications), Lines 3-4, replace "Internaction" with -- Interaction --.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*